(12) United States Patent
Pu et al.

(10) Patent No.: US 7,152,213 B2
(45) Date of Patent: Dec. 19, 2006

(54) SYSTEM AND METHOD FOR DYNAMIC KEY ASSIGNMENT IN ENHANCED USER INTERFACE

(75) Inventors: Kent Qing Pu, San Diego, CA (US); Akmad Alkhatib, San Diego, CA (US)

(73) Assignee: Infogation Corporation, San Diego, CA (US)

( * ) Notice: Subject to any disclaimer, the term of this patent is extended or adjusted under 35 U.S.C. 154(b) by 754 days.

(21) Appl. No.: 09/971,905

(22) Filed: Oct. 4, 2001

(65) Prior Publication Data

US 2003/0067495 A1     Apr. 10, 2003

(51) Int. Cl.
*G06F 3/00* (2006.01)
*G09G 5/08* (2006.01)

(52) U.S. Cl. ..................... 715/812; 715/816

(58) Field of Classification Search ........... 345/789, 345/811, 745, 841–843, 845; 715/789, 765–767, 715/811–812, 968, 864, 856, 860–861, 821–824, 715/702, 780, 771–773, 744–747, 805, 813, 715/816

See application file for complete search history.

(56) References Cited

U.S. PATENT DOCUMENTS

| | | | |
|---|---|---|---|
| 5,818,437 A | 10/1998 | Grover et al. | |
| 5,828,374 A | 10/1998 | Coleman et al. | |
| 5,828,991 A * | 10/1998 | Skiena et al. | ............ 704/9 |
| 5,896,321 A * | 4/1999 | Miller et al. | ........ 365/189.01 |
| 6,011,554 A * | 1/2000 | King et al. | ........... 715/811 |
| 6,084,576 A * | 7/2000 | Leu et al. | ............ 345/168 |
| 6,121,965 A * | 9/2000 | Kenney et al. | ........ 715/810 |
| 6,163,279 A * | 12/2000 | Motoe | ................ 341/20 |
| 6,178,338 B1 * | 1/2001 | Yamagishi et al. | ..... 455/566 |
| 6,204,848 B1 * | 3/2001 | Nowlan et al. | ......... 715/810 |
| 6,266,060 B1 | 7/2001 | Roth | |
| 6,286,064 B1 * | 9/2001 | King et al. | .............. 710/67 |
| 6,295,052 B1 * | 9/2001 | Kato et al. | ............. 345/179 |
| 6,307,548 B1 * | 10/2001 | Flinchem et al. | ....... 715/811 |
| 6,307,549 B1 * | 10/2001 | King et al. | ............. 715/810 |
| 6,414,700 B1 * | 7/2002 | Kurtenbach et al. | .... 715/810 |
| 6,437,709 B1 * | 8/2002 | Hao | .................. 341/23 |
| 6,473,675 B1 * | 10/2002 | Sample | .................. 701/3 |
| 6,532,001 B1 * | 3/2003 | Taraki et al. | ............ 345/163 |
| 6,812,939 B1 * | 11/2004 | Flores et al. | ............ 715/771 |
| 6,831,752 B1 * | 12/2004 | Matsuo | .............. 358/1.13 |
| 6,885,317 B1 * | 4/2005 | Gutowitz | ................. 341/22 |
| 6,970,881 B1 * | 11/2005 | Mohan et al. | ........... 707/102 |
| 2001/0045938 A1 * | 11/2001 | Willner et al. | .......... 345/156 |
| 2002/0054135 A1 * | 5/2002 | Noguchi et al. | ........ 345/788 |

(Continued)

*Primary Examiner*—Steven P. Sax
(74) *Attorney, Agent, or Firm*—Joe Zheng

(57) ABSTRACT

An improved user interface for data input without the use of a standard keyboard is provided. Input is accepted through a data entry means such as a shuttle control system, a standard telephone keypad, or a speech recognition system. The data that is entered is selected from a predefined list that is presented to a user in an arrangement that statistically reduces the number of keystrokes required for data entry. This presentation is the result of determining the relative frequency of each valid selection in the predefined list and presenting those valid selections with the highest frequency items in a position that minimizes the number keystrokes required for data entry. In a speech recognition embodiment, the data entered is selected from an active list containing unique sounding entries. Alternatively, the data entered may be selected by speaking the numbers associated with the keys corresponding to the keystrokes required for data entry.

15 Claims, 24 Drawing Sheets

U.S. PATENT DOCUMENTS

2002/0122215 A1* 9/2002 Watanabe .................. 358/474
2004/0021691 A1* 2/2004 Dostie et al. ............... 345/773
2004/0168131 A1* 8/2004 Blumberg .................. 715/534
2005/0144182 A1* 6/2005 Boris et al. ................. 707/100

* cited by examiner

| Letter | Frequency |
|--------|-----------|
| SA | 48 |
| SC | 1 |
| SE | 4 |
| SH | 2 |
| SI | 4 |
| SK | 1 |
| SO | 12 |
| SP | 2 |
| ST | 8 |
| SU | 11 |
| SY | 1 |

| Letter | Frequency |
|--------|-----------|
| SA | 48 |
| SO | 12 |
| SU | 11 |
| ST | 8 |
| SE | 4 |
| SI | 4 |
| SH | 2 |
| SP | 2 |
| SC | 1 |
| SK | 1 |
| SY | 1 |

| Letter | Frequency |
|---|---|
| SAN_ | 30 |
| SAND | 1 |
| SANG | 1 |
| SANT | 11 |

| Letter | Frequency |
|---|---|
| SAN_ | 30 |
| SANT | 11 |
| SAND | 1 |
| SANG | 1 |

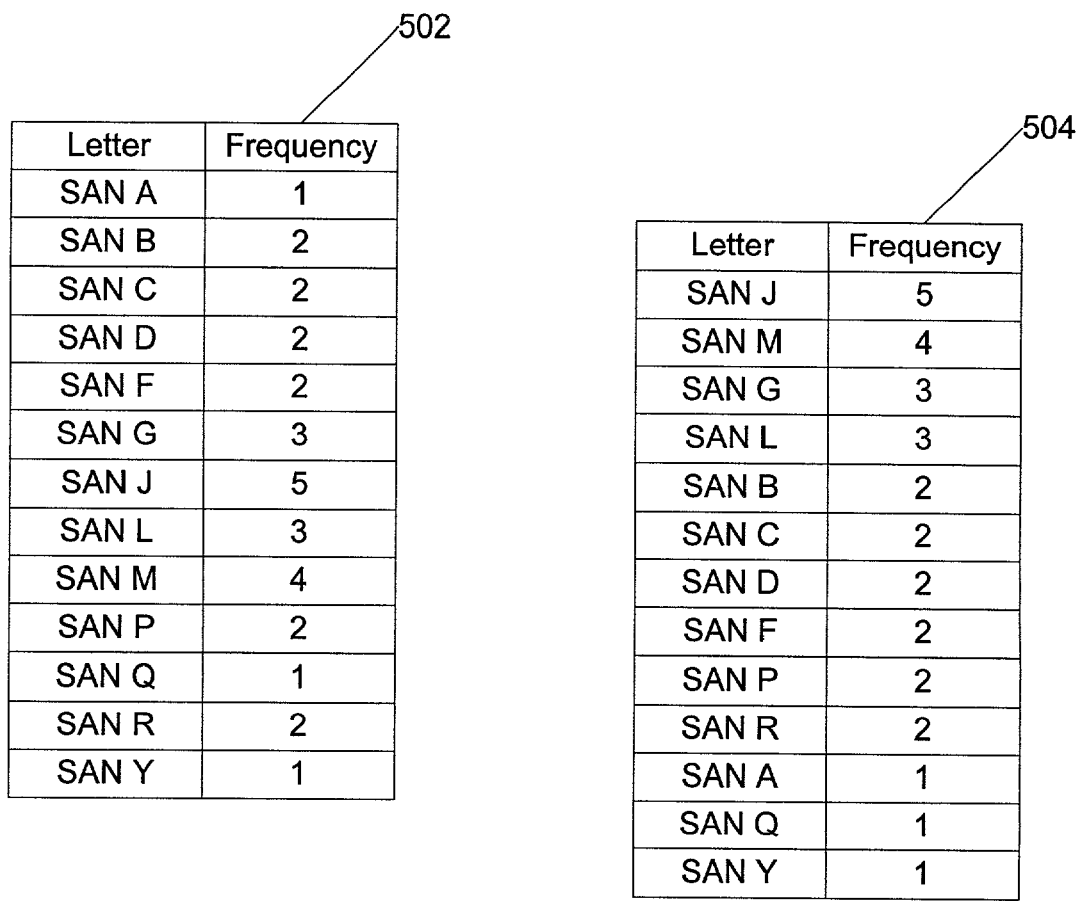
FIG. 7A
FIG. 7B
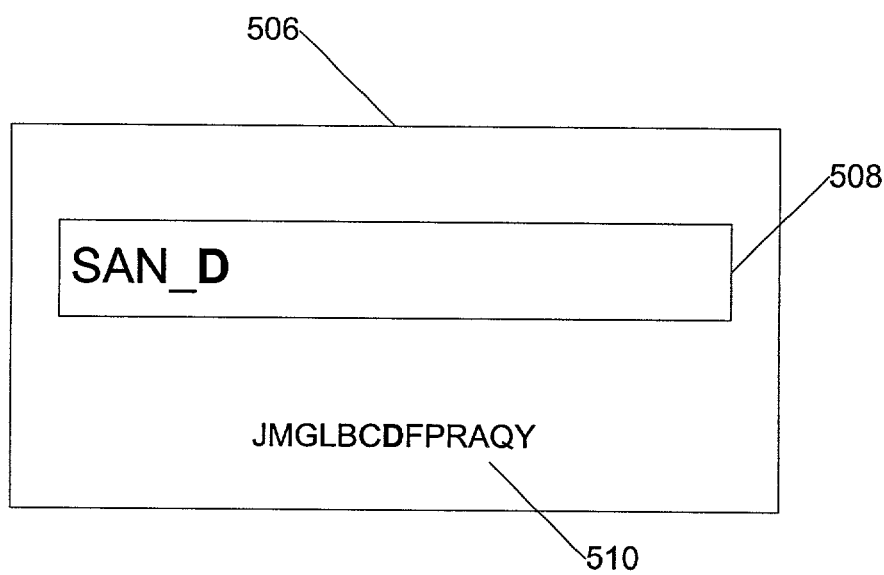
FIG. 7C

| Letter | Frequency |
|---|---|
| SAN_DIE | 1 |
| SAN_DIM | 1 |
FIG. 9A
| Letter | Frequency |
|---|---|
| SAN_DIE | 1 |
| SAN_DIM | 1 |
FIG. 9B
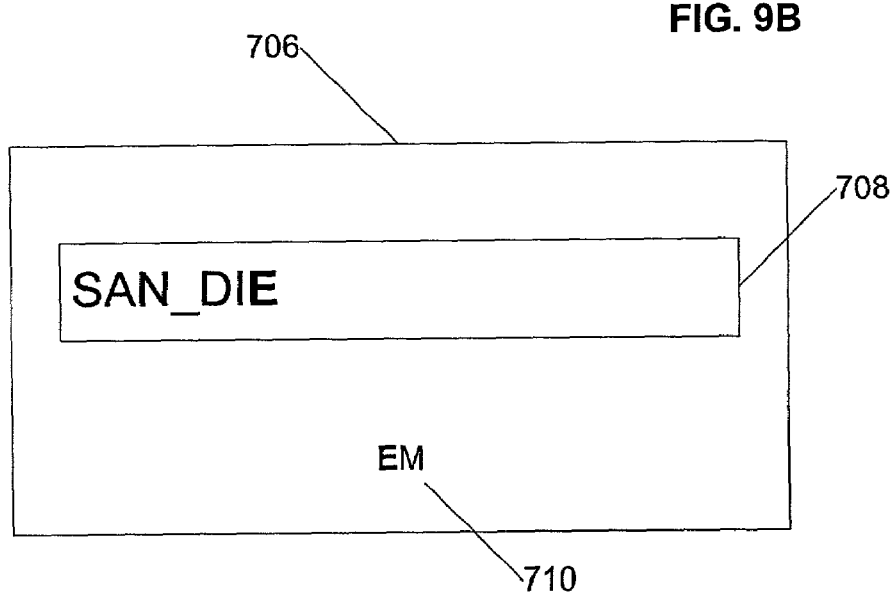
FIG. 9C
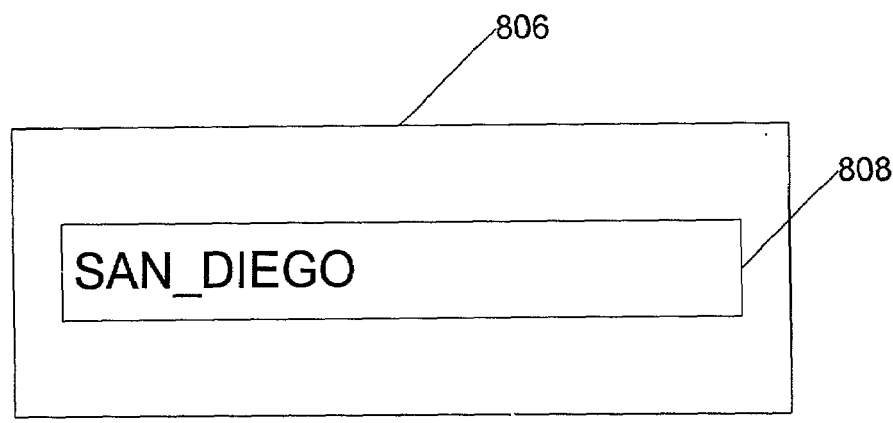
FIG. 10

| 1 | 2<br>ABC | 3<br>DEF |
|---|---|---|
| 4<br>GHI | 5<br>JKL | 6<br>MNO |
| 7<br>PQRS | 8<br>TUV | 9<br>WXYZ |

| 9 | 5 | 8 |
|---|---|---|
| 3 | 1 | 2 |
| 6 | 4 | 7 |

| S |
|---|

| 1<br>QX | 2<br>IYK | 3<br>UJZ |
|---|---|---|
| 4<br>RWA | 5<br>SCL | 6<br>MPB |
| 7<br>EOV | 8<br>TFG | 9<br>HND |

| SA |
|---|

| 1 | 2<br>I | 3 |
|---|---|---|
| 4<br>HPC | 5<br>AOU | 6<br>TEI |
| 7 | 8<br>KY | 9 |

| Letter | Mapping | Voice |
|---|---|---|
| A | 2,1 | TWO, ONE |
| B | 2,2 | TWO, TWO |
| C | 2,3 | TWO, THREE |
| D | 3,1 | THREE, ONE |
| E | 3,2 | THREE, TWO |
| F | 3,3 | THREE, THREE |
| G | 4,1 | FOUR, ONE |
| H | 4,2 | FOUR, TWO |
| I | 4,3 | FOUR, THREE |
| J | 5,1 | FIVE, ONE |
| K | 5,2 | FIVE, TWO |
| L | 5,3 | FIVE, THREE |
| M | 6,1 | SIX, ONE |
| N | 6,2 | SIX, TWO |
| O | 6,3 | SIX, THREE |
| P | 7,1 | SEVEN, ONE |
| Q | 7,2 | SEVEN, TWO |
| R | 7,3 | SEVEN, THREE |
| S | 7,4 | SEVEN, FOUR |
| T | 8,1 | EIGHT, ONE |
| U | 8,2 | EIGHT, TWO |
| V | 8,3 | EIGHT, THREE |
| W | 9,1 | NINE, ONE |
| X | 9,2 | NINE, TWO |
| Y | 9,3 | NINE, THREE |
| Z | 9,4 | NINE, FOUR |

(column headers marked 1204, 1206, 1208)

FIG. 15

|   | 1 | 2 | 3 | 4 | 5 | 6 | 7 | 8 | 9 |
|---|---|---|---|---|---|---|---|---|---|
| Q |   |   |   |   |   |   |   |   |   |
| 1 | A,A | A,B | A,C | A,D | A,E | A,F | A,G | A,H | A,I |
| 2 | B,A | B,B | B,C | B,D | B,E | B,F | B,G | B,H | B,I |
| 3 | C,A | C,B | C,C | C,D | C,E | C,F | C,G | C,H | C,I |
| 4 | D,A | D,B | D,C | D,D | D,E | D,F | D,G | D,H | D,I |
| 5 | E,A | E,B | E,C | E,D | E,E | E,F | E,G | E,H | E,I |
| 6 | F,A | F,B | F,C | F,D | F,E | F,F | F,G | F,H | F,I |
| 7 | G,A | G,B | G,C | G,D | G,E | G,F | G,G | G,H | G,I |
| 8 | H,A | H,B | H,C | H,D | H,E | H,F | H,G | H,H | H,I |
| 9 | I,A | I,B | I,C | I,D | I,E | I,F | I,G | I,H | I,I |

| Q | 1 | 2 | 3 | 4 | 5 | 6 | 7 | 8 | 9 |
|---|---|---|---|---|---|---|---|---|---|
| 1 | A,A | A,B | A,C | A,D | A,E | A,F | A,G | A,H | A,I |
| 2 | B,A | B,B | B,C | B,D | B,E | B,F | B,G | B,H | B,I |
| 3 | C,A | C,B | C,C | C,D | C,E | C,F | C,G | C,H | C,I |
| 4 | D,A | D,B | D,C | D,D | D,E | D,F | D,G | D,H | D,I |
| 5 | E,A | E,B | E,C | E,D | E,E | E,F | E,G | E,H | E,I |
| 6 | F,A | F,B | F,C | F,D | F,E | F,F | F,G | F,H | F,I |
| 7 | G,A | G,B | G,C | G,D | G,E | G,F | G,G | G,H | G,I |
| 8 | H,A | H,B | H,C | H,D | H,E | H,F | H,G | H,H | H,I |
| 9 | I,A | I,B | I,C | I,D | I,E | I,F | I,G | I,H | I,I |

FIG. 21

| |
|---|
| 2 |
| 5 |
| 5 |
| 5 |
| 5 |
| 1 |
| 5 |
| 2 |
| 1 |

FIG. 22

| cluster 1 | A,B |
|---|---|
| cluster 2 | C,F |
| cluster 3 | D,H |
| cluster 4 | E,I |
| cluster 5 | G |

FIG. 23

SYSTEM AND METHOD FOR DYNAMIC KEY ASSIGNMENT IN ENHANCED USER INTERFACE

BACKGROUND OF THE INVENTION

1. Field of the Invention

The present invention generally relates to an enhanced user interface for inputting textual data into a computer device and more specifically relates to dynamically assigning characters to input groups or keys to reduce data input keystrokes or increase the efficiency of voice input recognition.

2. Related Art

Recently, there has been a notable increase in the use of microprocessors for business and casual use. Intelligent electronic devices are becoming much more prevalent in homes, businesses, and even in transportation vehicles such as automobiles, boats and airplanes. Such intelligent devices include automobile computers ("auto PCs"), major home appliances, personal digital assistants ("PDAs"), telephones, cellular telephones, internet phones, pagers, portable computers, navigational devices, and the like. Many of these devices require users to input textual data. However, the portable nature of these devices makes the use of standard keyboards both undesirable and impracticable.

For these reasons, alternative means for inputting textual data have become available. In one example, touch screens are used in combination with "electronic" stylus pens for inputting textual data through character recognition and/or keyboard emulation techniques. Many PDAs in use today, for example, utilize this method for inputting textual data.

Other devices, such as cellular telephones and the like, utilize standard telephone keypads for inputting alphanumeric data. In one example, a standard telephone keypad attached to a cellular telephone is used not only to dial phone numbers, but to enter names, addresses, and telephone numbers into an electronic address book. Such keypads are also commonly used to enter alphanumeric data into PDAs, auto PCs, home appliances, and the like.

One technique commonly used for inputting alphanumeric data via a standard telephone keypad is to make use of the alphanumeric information already printed on the keys. This arrangement of information on the keys is used to represent the particular characters that can be input via each key. For example, the "2" key is used to enter any of the characters printed on the "2" key, namely the characters "A", "B", "C" and "2". The actual character that is input into the device depends on the number of times the particular key is successively pressed. For example, pressing the "2" key once results in inputting the letter "A". Pressing the "2" key twice in succession results in entering the letter "B". Likewise, the characters "C" and "2" are input by pressing the "2" key, three and four times in succession, respectively.

Another common solution to replace a conventional keyboard device is in the form of a shuttle control system. Generally, a shuttle control system is used to scroll through a list of predefined words, phrases and/or alphanumeric characters. When the desired data item appears on the display, or is highlighted by a cursor, the user selects that item by pressing an enter key.

Often shuttle control systems are implemented using a single joystick-like central key that can be pivoted up, down, right or left. The shuttle key is used to scroll data in accordance with the direction the shuttle control is pressed. Thus, for example, a user can scroll through the alphabet in an ascending or descending order, depending on whether the shuttle key is moved to the right or the left position (or the up or the down position). In some arrangements, the shuttle key can function as the enter key in addition to the direction key. For example, in some systems, the enter function is implemented by pressing down on the shuttle key, rather than pressing it in a particular direction.

Other shuttle control systems may have different arrangements of keys. For example, one common arrangement uses four separate keys that are organized in a pattern to represent the four directions of up, down, right and left. Typically, a key that functions as an enter key is placed in the center of the four directional keys. Another common arrangement may use an up key, a down key, and an enter key situated between the up and down keys. Other arrangements are also possible and may also include one or more additional keys.

Regardless of its form, this type of control is referred to herein as a "shuttle control system." Shuttle control systems are typically used when it is desirable to use fewer physical keys. Commonly, shuttle control systems are used in portable computing devices such as auto PCs, PDAs, cellular telephones, and other hand-held devices such as remote controls for web browsers and the like. However, as can be imagined, entering textual data through shuttle control systems can be both time-consuming and problematic.

Another conventional keyboard substitution solution is voice recognition software. This technology is especially useful in devices such as auto PCs, where it is important to keep one's hands and eyes on the road. Typically, these devices allow users not only to issue commands, but also to enter textual data by verbally spelling the words. The problem with these conventional solutions is that many letters sound alike and current voice recognition technology can have trouble distinguishing among similar sounding letters. For example, current systems have trouble distinguishing between the letter "B" and the letter "D." This voice recognition problem increases in noisy environments, such as automobiles and the like.

Accordingly, what is needed is an improved system and method for inputting textual data without the use of a standard keyboard.

SUMMARY OF THE INVENTION

The present invention provides an improved user interface used to input data without the use of a standard keyboard. The system accepts input through a data entry means such as a shuttle control system or a standard telephone keypad. The data that is entered is selected from a predefined list. The list is presented to the user in an arrangement that statistically reduces the number of keystrokes required for data entry. This presentation is the result of determining the relative frequency of each valid selection in the predefined list and presenting those valid selections with the highest frequency in a position that minimizes the number keystrokes required for data entry.

One aspect of the invention allows a standard telephone keypad to be presented on a display with the valid data entry selections dynamically assigned to the keys on the keypad. Another aspect of the invention presents the valid data entry selections in a linear fashion on the display with the highest frequency selections closest to the default cursor position. Yet another aspect of the invention allows for similar sounding letters in a dynamically defined group of available letters to be arranged in a fashion that improves the implementation of voice recognition. Additional aspects and features of the present invention will become apparent after viewing the following figures and reading the corresponding detailed description.

BRIEF DESCRIPTION OF THE FIGURES

The details of the present invention, both as to its structure and operation, may be gleaned in part by study of the accompanying drawings, in which like reference numerals refer to like parts, and in which:

FIGS. 7A–7C are block diagrams illustrating example predefined lists associated with contextual data entry for an input control system according to various embodiments of the present invention;

FIGS. 9A–9C are block diagrams illustrating example predefined lists associated with contextual data entry for an input control system according to various embodiments of the present invention;

FIG. 10 is a block diagram illustrating an input control system with data entry completed according to an embodiment of the present invention FIG. 11 is a block diagram illustrating a conventional standard telephone keypad;

FIG. 12 is a block diagram illustrating an example frequency mapping for a standard telephone keypad according to an embodiment of the present invention;

FIGS. 13A–13H are block diagrams illustrating example dynamic mappings of characters on a keypad according to an embodiment of the present invention;

FIG. 15 is a block diagram illustrating a predefined list in tabular format according to an embodiment of the present invention;

FIG. 21 is a block diagram illustrating an example dynamically defined conditional probability matrix according to an embodiment of the present invention;

FIG. 22 is a block diagram illustrating an example dynamically defined cluster table according to an embodiment of the present invention;

FIG. 23 is a block diagram illustrating an example dynamically defined character mapping according to an embodiment of the present invention.

DETAILED DESCRIPTION OF THE PREFERRED EMBODIMENTS

Certain embodiments as disclosed herein provide for systems and methods for dynamically assigning characters to input keys to reduce the number of data entry actions during data input. For example, a predetermined list can be dynamically ordered such that the most frequently selected entries are positioned at the front of the list. Additionally, when entering the individual letters of the items in the list, the letters can be dynamically arranged such that those letters with the highest frequency of use are positioned at the front of the list.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
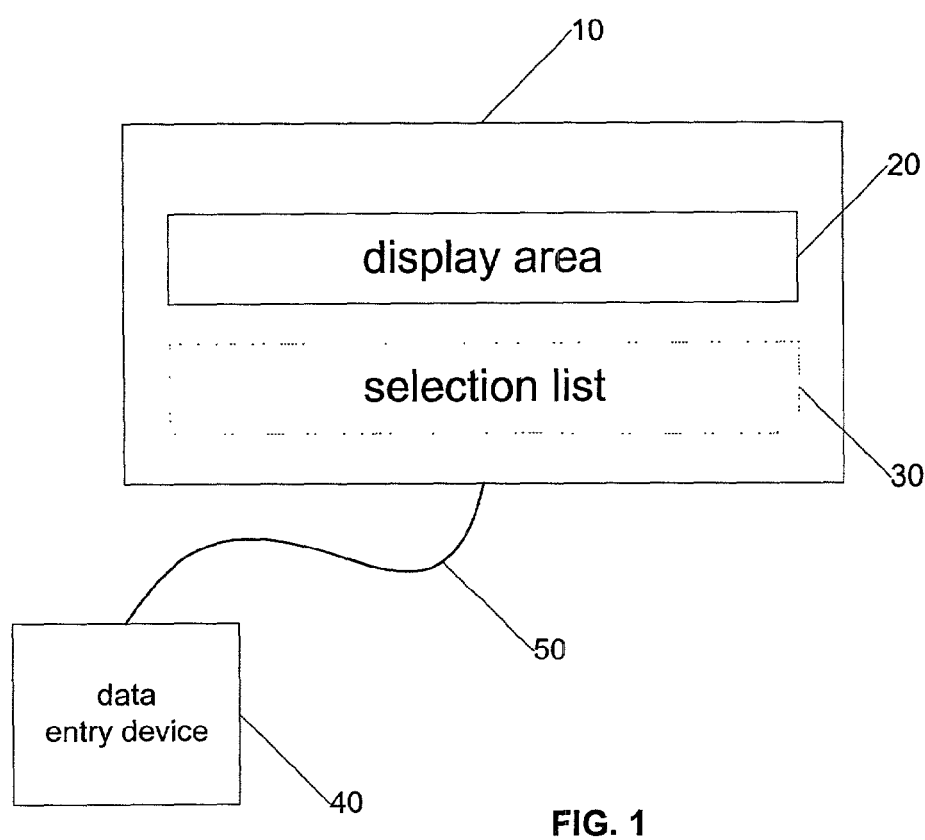
FIG. 1 is a block diagram illustrating an example input control system according to an embodiment of the present invention.

FIG. 1 is a block diagram illustrating an example input control system 10. The input control system 10 may comprise a display area 20 and a selection list 30. Preferably, input control system 10 is communicatively coupled with data entry device 40, for example a shuttle control system as previously described. Data entry device 40 is preferably communicatively coupled with input control system 10 over communications link 50. Communications link 50 may be implemented in various formats such as a wired link, a wireless link, or an infra red link, just to name a few.

In the various embodiments, alternative layouts for the display area 20 and the selection list 30 of input control system 10 may be employed. The layout and presentation may be determined by the type of intelligent device in which input control system 10 is implemented. For example, as will be understood by one skilled in the art, a wireless communications device such as a cell phone may have one configuration while a PC in an automobile ("auto PC") may have a different configuration.

Although various embodiments and implementations are contemplated by the broad scope of the present invention, for the purposes of this detailed description and the examples provided herein, the description will be explained in the context of a user providing input to an intelligent device through a data entry mechanism. The intelligent device will be described as an auto PC or a wireless communications device and the data entry mechanism will be described as a shuttle control system, an alphanumeric keypad, or a telephonic keypad.

Furthermore, in certain examples presented herein, it is assumed that a point in the data entry process has been reached, where the device is expecting textual input from a user in the form of a name of a particular city within the states of California or Nevada. It is also assumed that the auto PC has access to a database comprising a predefined list of all cities within those two states.

Such a database may be locally located on a fixed storage drive such as a hard drive integrated with the auto PC or on a removable storage disc such as a CD. The database may also be remotely located on a server device in wireless communication with the auto PC. Preferably, when remotely located, the wireless communication link meets a minimum threshold for communication speed to meet consumer demands.

A locally located database may advantageously be updated by a remotely located server device to keep the information stored in the local database current. For example, short messages such as mobile emails or the like may be used to update the database content including the names of cities and the associated relative frequency for the next character in the city name. Alternatively, the content of the database may be updated from a remote server while the frequency of the next character information is computed locally by the auto PC. It is understood that this specific context in which the present invention is described is merely one embodiment and that various alternative embodiments will be apparent to one having ordinary skill in the art.

Additionally, it should be noted that the present invention can be used for inputting any type of textual data that has a corresponding predefined list, such as the list of cities described in the examples presented herein. However, the size of the predefined list is limited only by the storage capacity of the device being used to implement the present invention. Conceivably, there is no limit to the size of the predefined list that can be used in an embodiment of the present invention. For example, in one embodiment, the predefined list may comprise all words defined for any particular language that is being used by an implementation of the present invention.

Accordingly, it is important to note the examples used herein are presented only for the limited purpose of describing in detail, how to make and use the present invention. As such, these examples should not be construed to limit the scope and breadth of the present invention in any manner whatsoever.

Figure 2:
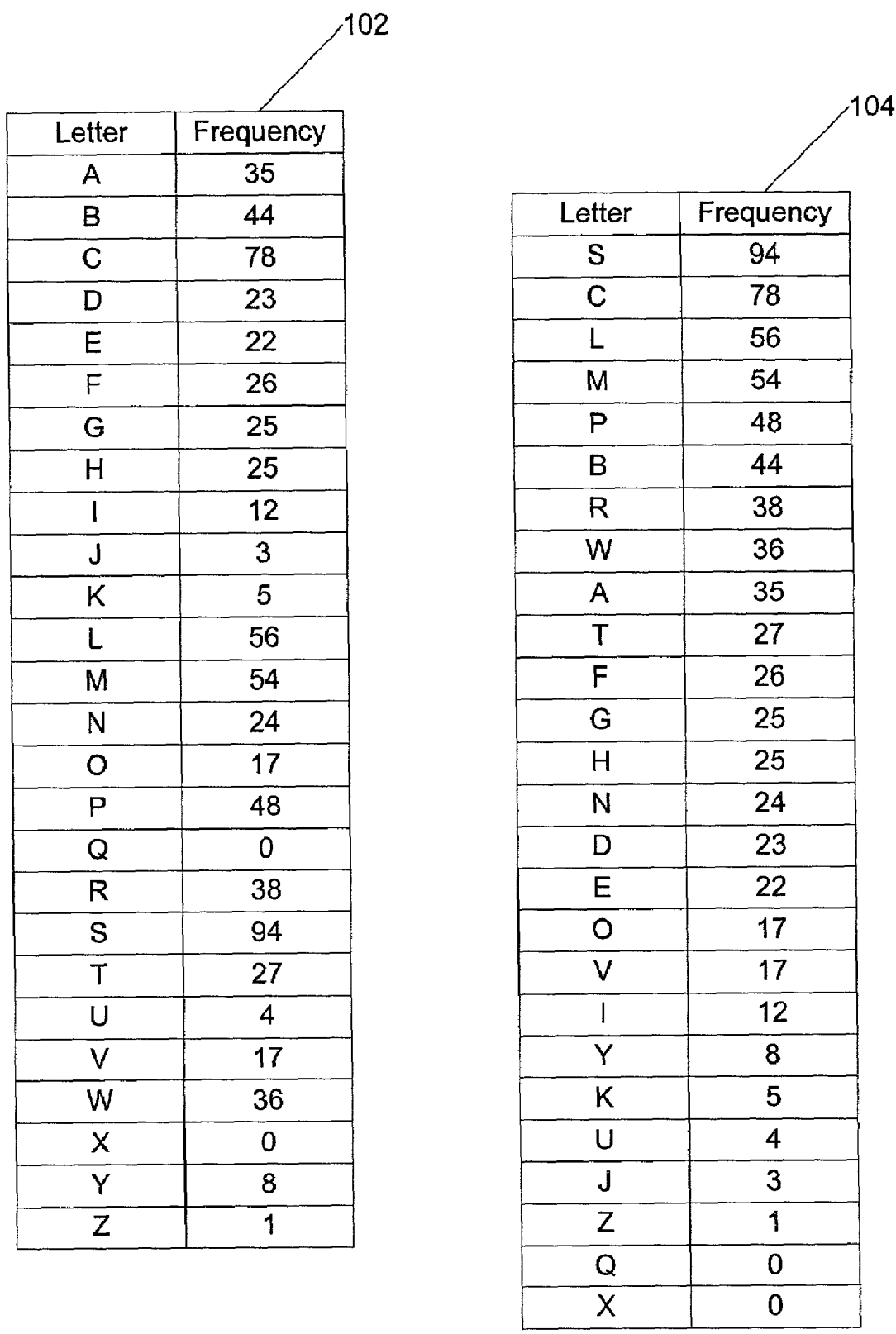
FIG. 2 is a block diagram illustrating two predefined lists in tabular format according to an embodiment of the present invention.

FIG. 2 is a block diagram illustrating two predefined lists in tabular format according to an embodiment of the present invention. Table 102 presents an alphabetically ordered predefined list of cities in the states of California and Nevada. The table collapses the entries in the list according to the first letter of the city name. The number of cities available for each letter in the alphabet is also presented. This number is referred to as the frequency. For example, there are 35 cities with names that begin with A, 44 cities with names that begin with B, and 78 cities with names that begin with C, and so on through the alphabet.

Table 104 presents the same list ordered by frequency. Thus, the most commonly used letters are at the top of the table. As can be seen, the most frequently used first letter for cities within California and Nevada, is the letter S, which corresponds to 94 entries in the predefined list. The next most commonly used letter is the letter C, which corresponds to 78 entries, and so on. The least commonly used first letters of cities in this example are the letters Q and X, each having zero list entries.

Figure 3A:
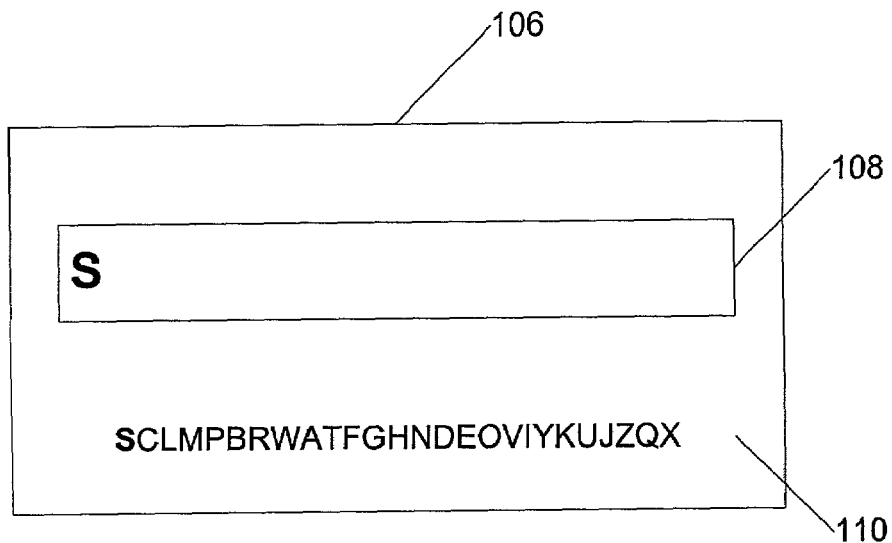
FIGS. 3A–3C are block diagrams illustrating example selection list arrangements according to various embodiments of the present invention.
Figure 3B:
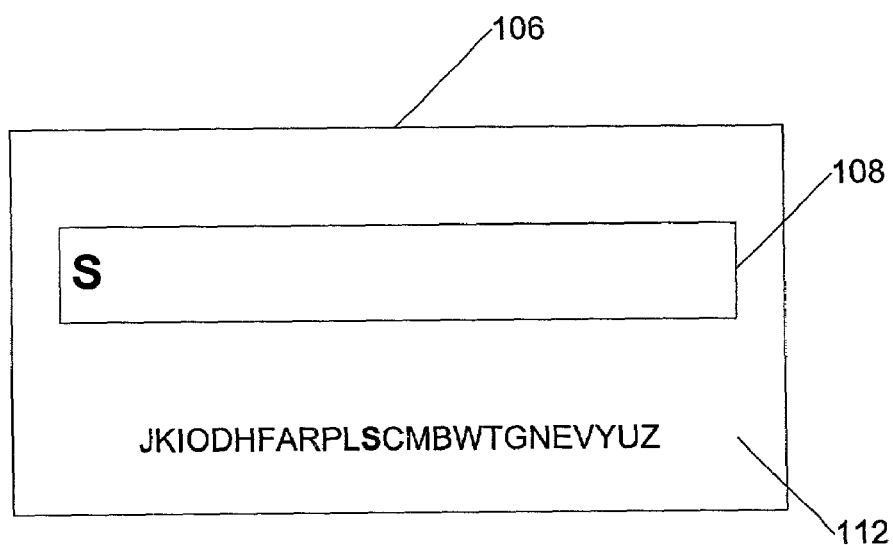
Figure 3C:
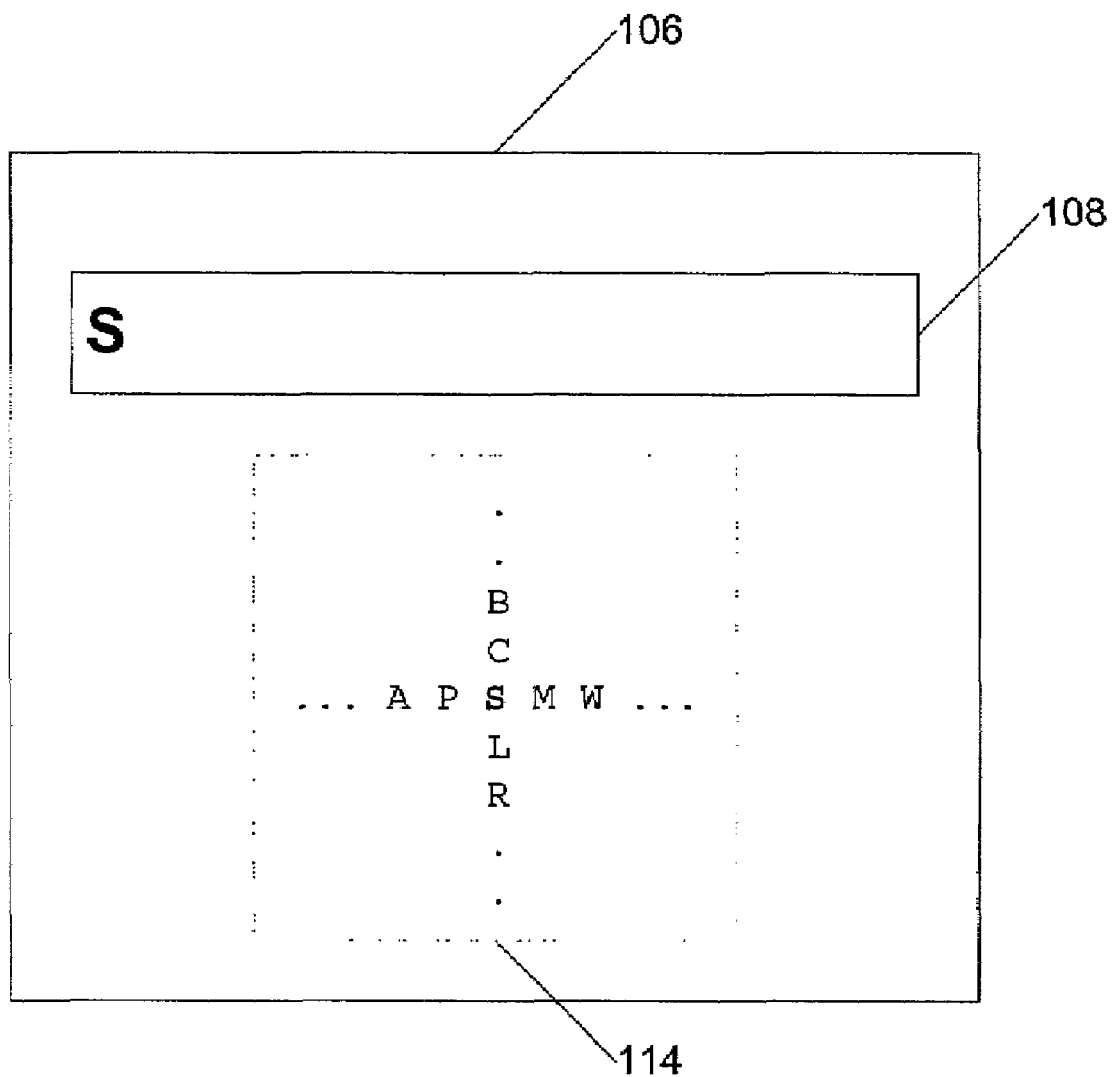

FIGS. 3A–3C are block diagrams illustrating example selection list arrangements according to various embodiments of the present invention. As previously stated, in these examples, it is assumed that the application program is expecting the user to input an item from the predefined list of city names from California and Nevada. Additionally, it is assumed that a data entry mechanism (not shown) is used to provide input.

For example, a shuttle control system can be used. As described above, a shuttle key can be used to scroll through a list of predefined words, phrases and/or alphanumeric characters. When the desired data item appears on the display, the user can select the displayed item by pressing an enter key. In the examples below, the scrolling feature is implemented by using a cursor control that highlights one character at a time when positioned over the character. This is referred to as the current cursor position.

Often, shuttle control systems are implemented as a single joystick-like central key that can be pivoted in an up, down, right or left direction. The shuttle key is used to scroll data or control a cursor in accordance with the direction the shuttle key is pressed. For example, a user can scroll through the alphabet in an ascending or descending order, depending on whether the shuttle key is moved to the right or the left position (or the up or the down position). In some arrangements, the shuttle key can function as the enter key in addition to the directional key. For example, in some systems the enter function is implemented by pressing down on the shuttle key, rather than moving it in one of the four directions as described above.

Other shuttle control systems may have more than one key and different arrangements for the keys. For example, one common arrangement uses four separate keys that are organized in a pattern to represent the four directions of up, down, right and left. Typically, a key that functions as the enter key is placed in the center of the four directional keys. Another common arrangement may use an up key, a down key, and an enter key situated between the up and down keys.

FIG. 3A is a block diagram illustrating an example selection list arrangement according to an embodiment of the present invention. In FIG. 3A, input control system 106 comprises a display area 108 and a selection list 110. Display area 108 is preferably used to present the selections made from the selection list 110. Additionally, display area 108 may present the highlighted character corresponding to the current cursor position. For example, the cursor in FIG. 3A may be positioned over the letter S. In this example embodiment, the user can alter the current cursor position by moving the cursor in either the right or left direction by pressing the shuttle key (not shown) in the appropriate direction.

Selection list 110 preferably contains only valid choices. In this fashion, the user is prevented from having to look at and scroll through letters that are not valid input. For example, the letters Q and X do not appear in the selection list 110, thereby preventing erroneous input. In addition, referring back to table 104 in FIG. 2, the letters that are most frequently used appear at the beginning of the selection list 110. Advantageously, this arrangement of selection list 110 statistically decreases the number of data entry actions required to select the desired letter.

Thus, the most common letters appear closer to the beginning of the selection list 110. In this fashion required keystrokes to select letters are statistically reduced. In this example, the user selects the letter S. According to table 104 in FIG. 2, the letter S appears as the first entry in the selection list 110 because it is the most common first letter in the predefined list. Consequently, no cursor movement or scrolling is required to select this letter. If fact, because in this example, the current cursor position defaults to the first letter in the list 110, the user may simply press the enter key to select the letter S.

It should be noted that the arrangement of letters in the selection list 110, is just one example of an implementation of the present invention. Alternative arrangements are also possible and may be more desirable than this first example. In all cases, it is important to arrange the selection list in such a manner as to statistically reduce the number of keystrokes required to select the more commonly used characters.

FIG. 3B is a block diagram illustrating an example selection list arrangement according to an embodiment of the present invention. In FIG. 3B, input control system 106 comprises display area 108 and selection list 112. Advantageously, selection list 112 is arranged such that the most common letter S is in the center of the list. In this example, as in all of the examples presented herein, the default cursor position is coincident with the most commonly used character, which in this case is the letter S.

The second most common letter C is one cursor position to the right of S. The third most common letter L is one cursor position to the left of S. The forth and fifth most common letters M and P, are placed two cursor positions, to the right and left respectively, from the letter S. This pattern is repeated for the remaining letters as shown in selection list 112. Advantageously, because the data entry mechanism can scroll either to the left or to the right, fewer keystrokes are required. For example, to select the second or third most common letters, only one cursor keystroke is required. Likewise, to select the fourth or fifth most common letters, only two cursor keystrokes are required. Thus, fewer keystrokes are required using the arrangement presented in FIG. 3B rather than the arrangement presented in FIG. 3A.

Although fewer keystrokes may be required using the arrangement presented in FIG. 3B, that arrangement may be more desirable for certain implementations of the present invention. However, it should be noted that the arrangement presented in FIG. 3B requires the user to be cognizant of the direction in which the desired letter is placed (i.e. whether it is displayed to the right or the left of the current cursor position). This additional visual acuity requirement may present a burden on the user that may not be desirable in certain implementations of the present invention. In such cases, the arrangement presented in FIG. 3A may be more desirable—even though additional keystrokes are required.

FIG. 3C is a block diagram illustrating an example selection list arrangement according to an embodiment of the present invention. In FIG. 3C, input control system 106 comprises display area 108 and selection list 114. Preferably, selection list 114 can be employed with a four-direction shuttle control system (not shown) as the data entry mechanism. Once again, the most common letter S appears in the middle of the arrangement in selection list 114. Advantageously, the second, third, fourth, and fifth most common letters are positioned only one cursor keystroke away. For example, the next most common letters appear up, down, right, and left, respectively. This pattern is repeated for the remaining characters as shown by selection list 114.

Accordingly, this third example requires fewer keystrokes than the previous two examples, but also requires the most visual acuity and the use of at least four keys, or four directions on a single shuttle key. Quite obviously, there can be many variations to the arrangements shown in the examples above. As such, it is again noted that these examples are used for the limited purpose of describing in detail, how to make and use the present invention, and should therefore not be construed to be limiting in any way.

Attention is now drawn to FIGS. 4–10, which describe the data entry process for selecting a city in California or Nevada. For convenience, the selection list used throughout FIGS. 4–10 is of the variety presented in FIG. 3A. It should be noted that for the purposes of this example, the user has already selected the letter S as the first letter of the city in California or Nevada.

Figures 4A, 4B, 4C:
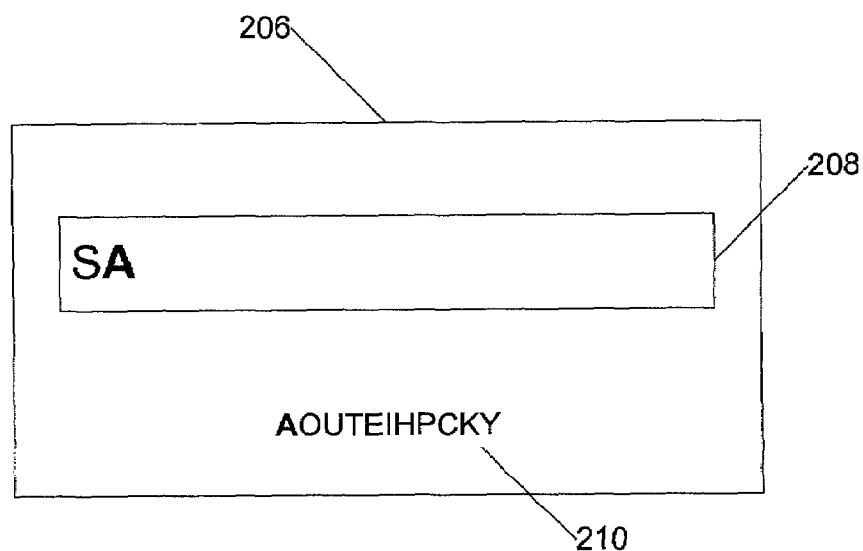
FIGS. 4A–4C are block diagrams illustrating example predefined lists associated with contextual data entry for an input control system according to various embodiments of the present invention.

FIGS. 4A–4C are block diagrams illustrating example predefined lists associated with contextual data entry for an input control system according to an embodiment of the present invention. Table 202 in FIG. 4A and table 204 in FIG. 4B represent a point in time where the intelligent device (e.g. auto PC) is now expecting the second character in the city name. Accordingly, the predefined list of cities in California and Nevada is processed to determine a list of possible second letters and their associated frequencies. The results are shown in tables 202 and 204, where table 202 is shown in alphabetical order and table 204 is sorted by frequency.

As shown by the tables 202 and 204 only eleven valid possibilities exist for a second character following the S. This character can be entered through input control system 206, which comprises display area 208 and selection list 210, as illustrated in FIG. 4C. As indicated by the selection list 210 (and table 204), the most common letter following the letter S is the letter A. In this example, the letter A is selected. Once again, because the most common letter in the selection list is the desired letter, the letter can be selected by merely pressing the enter key, without having to scroll through the list.

Figure 5A:
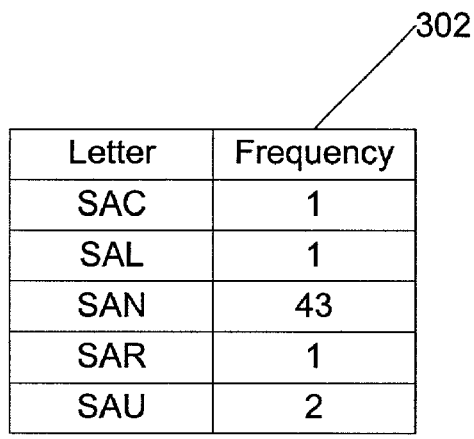
FIGS. 5A–5C are block diagrams illustrating example predefined lists associated with contextual data entry for an input control system according to various embodiments of the present invention.
Figure 5B:
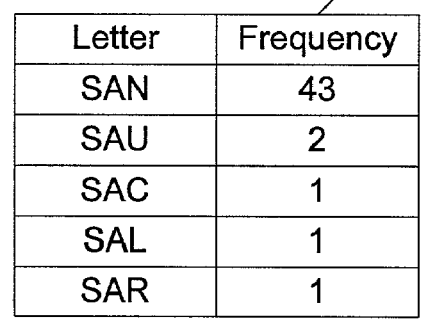
Figure 5C:
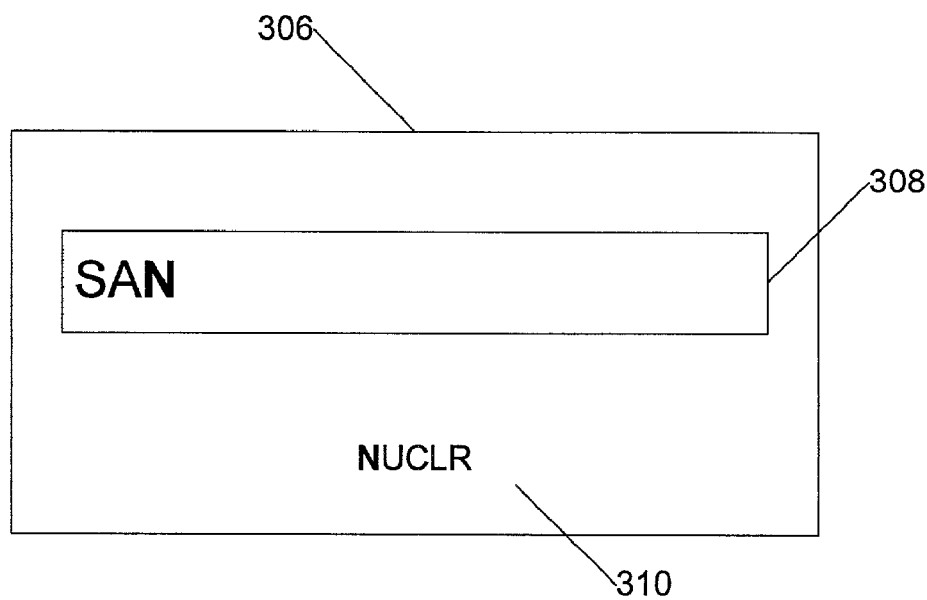

FIGS. 5A–5C are block diagrams illustrating example predefined lists associated with contextual data entry for an input control system according to an embodiment of the present invention. Table 302 in FIG. 5A and table 304 in FIG. 5B represent a point in time where the intelligent device (e.g. auto PC) is now expecting the third character in the city name. Accordingly, the predefined list of cities in California and Nevada is processed to determine a list of possible third letters and their associated frequencies. The results are shown in tables 302 and 304, where table 302 is shown in alphabetical order and table 304 is sorted by frequency.

As shown by the tables 302 and 304 only five valid possibilities exist for a third character following the SA. This character can be entered through input control system 306, which comprises display area 308 and selection list 310, as illustrated in FIG. 5C. As indicated by the selection list 310 (and table 304), the most common letter following the letters SA is the letter N. In this example, the letter N is selected. Once again, because the most common letter in the selection list is the desired letter, the letter can be selected by merely pressing the enter key, without having to scroll through the list. Thus, the first three letters are selected by the user by merely pressing the enter key, three times in succession.

Figures 6A, 6B, 6C:
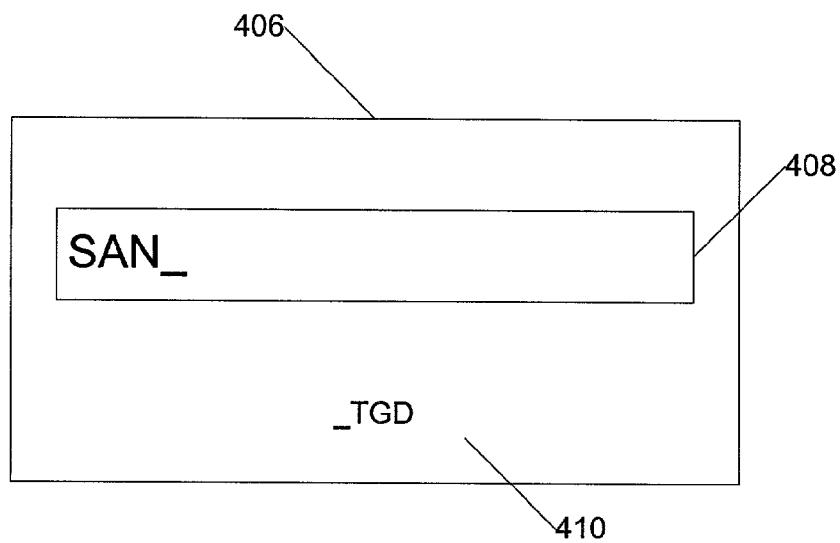
FIGS. 6A–6C are block diagrams illustrating example predefined lists associated with contextual data entry for an input control system according to various embodiments of the present invention.

FIGS. 6A–6C are block diagrams illustrating example predefined lists associated with contextual data entry for an input control system according to an embodiment of the present invention. Table 402 in FIG. 6A and table 404 in FIG. 6B represent a point in time where the intelligent device (e.g. auto PC) is now expecting the third character in the city name. Accordingly, the predefined list of cities in California and Nevada is processed to determine a list of possible fourth letters and their associated frequencies. The results are shown in tables 402 and 404, where table 402 is shown in alphabetical order and table 404 is sorted by frequency.

As shown by the tables 402 and 404 only four valid possibilities exist for a fourth character following the SAN. This character can be entered through input control system 406, which comprises display area 408 and selection list 410, as illustrated by FIG. 6C. As indicated by the selection list 410 (and table 404), the most common character following the letters SAN is the space character. In this example, the space character is selected. Once again, because the most common letter in the selection list is the desired letter, the letter can be selected by merely pressing the enter key, without having to scroll through the list. Thus, the first four characters are selected by the user by merely pressing the enter key, four times in succession.

FIGS. 7A–7C are block diagrams illustrating example predefined lists associated with contextual data entry for an input control system according to an embodiment of the present invention. Table 502 in FIG. 7A and table 504 in FIG. 7B represent a point in time where the intelligent device (e.g. auto PC) is now expecting the third character in the city name. Accordingly, the predefined list of cities in California and Nevada is processed to determine a list of possible fifth letters and their associated frequencies. The results are shown in tables 502 and 504, where table 502 is shown in alphabetical order and table 504 is sorted by frequency.

As shown by the tables 502 and 504 thirteen valid possibilities exist for a fifth character following the SAN_. This character can be entered through input control system 506, which comprises display area 508 and selection list 510, as illustrated by FIG. 7C. As indicated by the selection list 510 (and table 504), the most common character following the letters SAN_ is the letter J. In this example, the letter D is selected by scrolling the cursor over to the letter D and pressing enter.

Figure 8A:
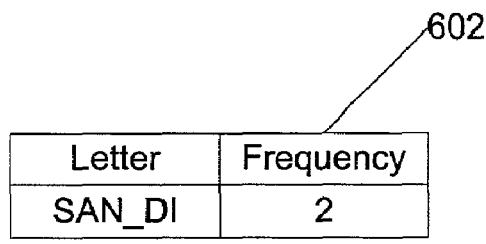
FIGS. 8A–8C are block diagrams illustrating example predefined lists associated with contextual data entry for an input control system according to various embodiments of the present invention.
Figure 8B:
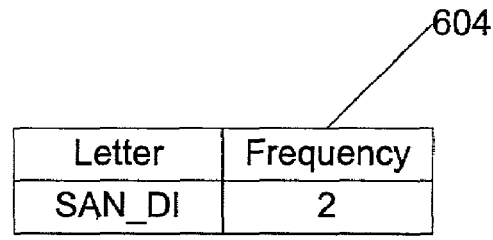
Figure 8C:
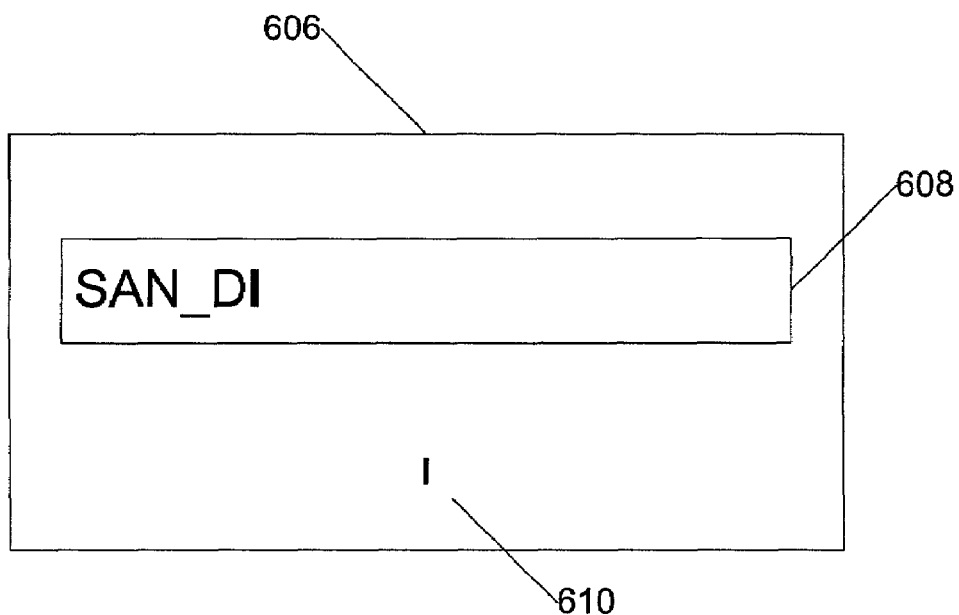

FIGS. 8A–8C are block diagrams illustrating example predefined lists associated with contextual data entry for an input control system according to an embodiment of the present invention. Table 602 in FIG. 8A and table 604 in FIG. 8B represent a point in time where the intelligent device (e.g. auto PC) is now expecting the third character in the city name. Accordingly, the predefined list of cities in California and Nevada is processed to determine a list of possible sixth letters and their associated frequencies. The results are shown in tables 602 and 604, where table 602 is shown in alphabetical order and table 604 is sorted by frequency.

As shown by the tables 602 and 604 only one valid possibility exists for a sixth character following the SAN_D. This character can be entered through input control system 606, which comprises display area 608 and selection list 610, as illustrated by FIG. 8C. As indicated by the selection list 610 (and table 604), the only valid character following the letters SAN_D is the letter I. In this example, the letter I is selected by pressing the enter key. Alternatively, the letter I may be automatically selected since it is the only valid character. Advantageously, auto selection reduces even further the number of required keystrokes.

FIGS. 9A–9C are block diagrams illustrating example predefined lists associated with contextual data entry for an input control system according to an embodiment of the present invention. Table 702 in FIG. 9A and table 704 in FIG. 9B represent a point in time where the intelligent device (e.g. auto PC) is now expecting the third character in the city name. Accordingly, the predefined list of cities in California and Nevada is processed to determine a list of possible seventh letters and their associated frequencies. The results are shown in tables 702 and 704, where table 702 is shown in alphabetical order and table 704 is sorted by frequency.

As shown by the tables 702 and 704 only two valid possibilities exist for a seventh character following the SAN_DI. This character can be entered through input control system 706, which comprises display area 708 and selection list 710, as illustrated in FIG. 9C. As indicated by the selection list 710 (and table 704), the most common character following the letters SAN_DI is the letter E and the letter M. Since both valid characters have equal frequency, they are presented in alphabetical order. Other arrangements for characters with equal frequency may also be employed. In this example, the letter E is selected.

At this point only one city in the list exits that begins with SAN_DIE, namely SAN_DIEGO. Accordingly, the full name of the city is presented in display area 808 of input control system 806, as shown in FIG. 10. In one embodiment, the city name SAN_DIEGO may be automatically selected and presented in display area 808. Alternatively, input control system 806 may require that the enter key be pressed to verify that the city name is correct.

The method presented in the example above may also be applied and used with alternative data entry mechanism such as a standard telephone keypad. FIG. 11 is a block diagram illustrating a conventional standard telephone keypad 902. However, in accordance with the present invention, the letters associated with each key in the keypad can advantageously be dynamically arranged in accordance with their corresponding frequency list, as described above. For example, the keys on a standard telephone keypad can be assigned relative frequencies such as in FIG. 12, which is a block diagram illustrating an example frequency mapping for a standard telephone keypad 904 according to an embodiment of the present invention.

This dynamic key assignment can be accomplished in several ways. In one embodiment, a standard telephone keypad can be used in combination with a display that shows the relationship between the physical keys and the associated characters. In this embodiment, the display can be used as a guide to determine which key to press. In an alternative embodiment, the keypad can be a virtual keypad that is presented on a touch screen display or the like. In this fashion, the input control system can dynamically change the key labels on the touch screen display. In yet another embodiment, a special keypad can be used in which the labels can be dynamically altered via software control. Regardless of the technology used to implement the labeling of the keys on the keypad, the principals in the following example apply.

Referring again to FIG. 11, the standard keypad 902 has a number printed on each key. In addition, zero to four letters are printed under each number. A common technique used for inputting alphanumeric data via a standard telephone keypad 902 is to make use of the alphanumeric information printed on the keys. This data is used to represent the specific characters that can be input via each key. For example, the 2 key is used to enter any of the characters printed on the 2 key, namely the characters A, B, C, and 2. The actual character that is input into the device depends on the number of times the particular key is successively pressed. For example, pressing the 2 key once results in inputting the letter A. Pressing the 2 key twice in succession results in entering the letter B. Likewise, the characters C and 2 are input by pressing the 2 key, three and four times in succession, respectively.

The same technique that is used with a standard keypad as described above, can be used with the present invention in the example below, except that the alphabetic characters associated with each key are dynamically changed in accordance with the most commonly used characters (i.e., the character frequency). In this manner, for example, at any one time, the three most commonly used characters can be associated with the central 5 key. As shown in FIG. 12, the central key may be assigned the highest priority of the available keys on the keypad 904.

The above example using the input stream of SAN DIEGO is again used to describe the dynamic key assignment aspect of the present invention. In fact, the same tables presented in FIGS. 2, 4, 5, 6, 7, 8, and 9 correspond to the keypads 1002, 1004, 1006, 1008, 1010, 1012, 1014 and 1016, respectively.

Continuing with reference to FIG. 12, keypad 904 illustrates the frequency mapping for keypad 904 that is used in the example below. In this example, the most common characters are associated with position 1, the second most common characters with position 2, and so on. As will be understood by one having ordinary skill in the art, many alternative frequency mappings may be employed. In one embodiment, the first three groupings can advantageously be placed within a single horizontal row that defines a home position for a human hand. In this fashion, the first 9 most commonly used characters can be entered without having to move from the home position.

FIG. 13A is a block diagram illustrating an example keypad 1002 showing the frequency mapping of valid characters. At this point, the user is being prompted to enter the first letter of a city from the predefined list of cities in California and Nevada, as described above. Pursuant to table 104 in FIG. 2, the three most commonly used first letters are S, C, and L, in that order. Accordingly, the letters S, C, and L are placed in that order under the 5 key, which represents the highest frequency position as shown in keypad 904 in FIG. 12. Thus, the S character can be entered by pressing the 5 key a single time. Similarly, the C character can be entered by pressing the 5 key twice and the L key can be entered by pressing the 5 key three times.

In a similar fashion, the remaining letters are arranged on keypad 1002 in accordance with their relative frequencies and according to the frequency mapping (e.g. FIG. 12). Thus, the M, N and O characters are placed under the 6 key, the R, W, and A characters are placed under the 4 key, and so on as shown on keypad 1002. In this example, because the letter S is entered as the first letter in the input stream, it can be entered by pressing the 5 key a single time. Advantageously, when highlighted as the current cursor position and also when entered, the selected character is presented in display area 1003.

FIG. 13B is a block diagram illustrating an example keypad 1004 having a frequency mapping of valid characters after the letter S. In this example, the letter A is selected by pressing the 5 key a single time. Preferably, the selected character is presented in display area 1005.

Figure 13C:
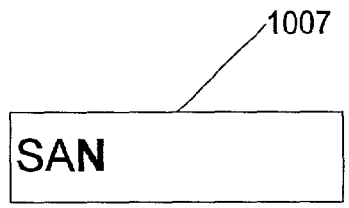

FIG. 13C is a block diagram illustrating an example keypad 1006 having a frequency mapping of valid characters after the letters SA. In this example, the letter N is selected by pressing the 5 key a single time. Preferably, the selected character is presented in display area 1007.

Figure 13D:
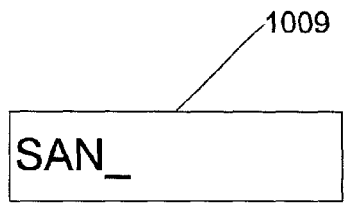

FIG. 13D is a block diagram illustrating an example keypad 1008 having a frequency mapping of valid characters after the letters SAN. In this example, the space character is selected by pressing the 5 key a single time. Preferably, the selected character is presented in display area 1009.

Figure 13E:
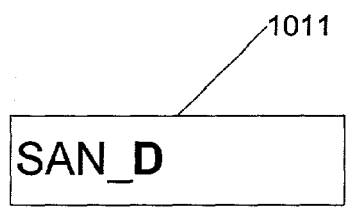

FIG. 13E is a block diagram illustrating an example keypad 1010 having a frequency mapping of valid characters after the characters SAN_. In this example, the letter D is selected by pressing the 4 key a single time. Preferably, the selected character is presented in display area 1011.

Figure 13F:
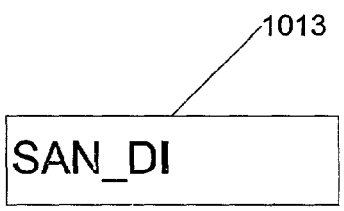

FIG. 13F is a block diagram illustrating an example keypad 1012 having a frequency mapping of valid characters after the characters SAN_D. In this example, the letter I is selected by pressing the 5 key a single time. Alternatively, the letter I may be automatically selected by the input control system since it is the only valid selection. Preferably, the selected character is presented in display area 1013.

Figures 13G, 13H:
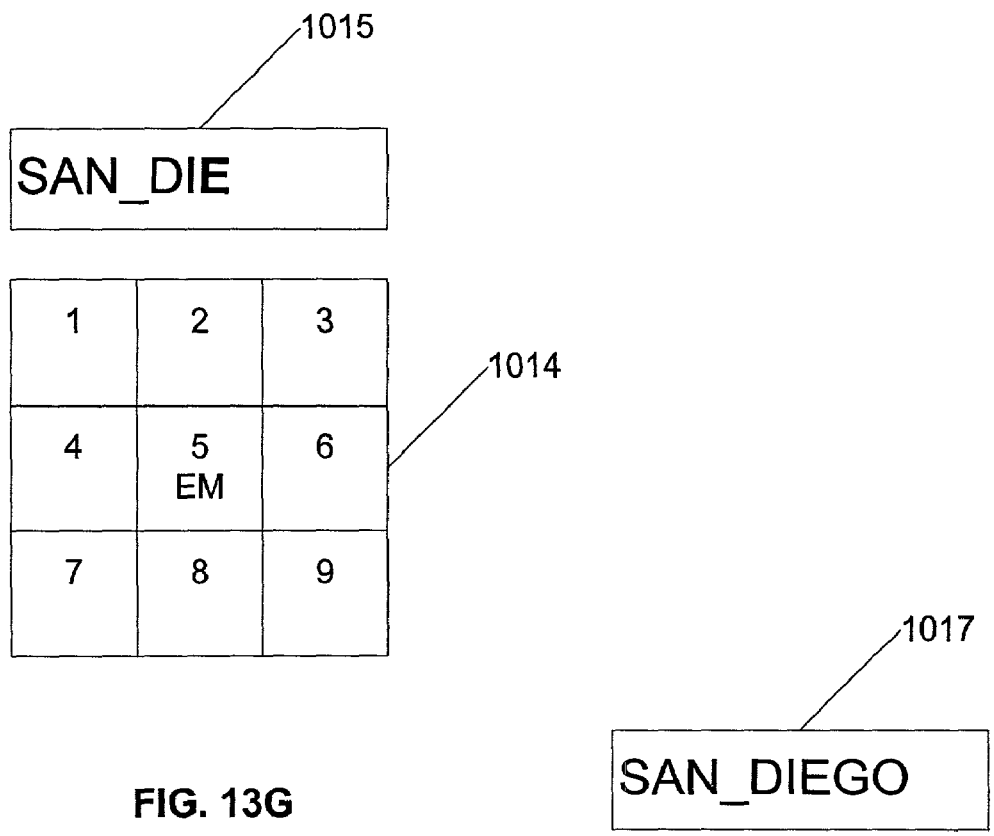

FIG. 13G is a block diagram illustrating an example keypad 1014 having a frequency mapping of valid characters after the characters SAN_DI. In this example, the letter E is selected by pressing the 5 key a single time. Preferably, the selected character is presented in display area 1015.

FIG. 13H is a block diagram illustrating an example keypad 1016 having a frequency mapping of valid characters for cities in California and Nevada. Presented in display area 1017 is the completed city name SAN_DIEGO. Advantageously, since SAN_DIEGO is the only valid item in the list that matches the input stream SAN_DIE, the city name can be automatically completed and presented in display area 1017. In one embodiment, the completed name may be presented and the user may be required to press the enter key to acknowledge that the name is correct.

Figure 14:
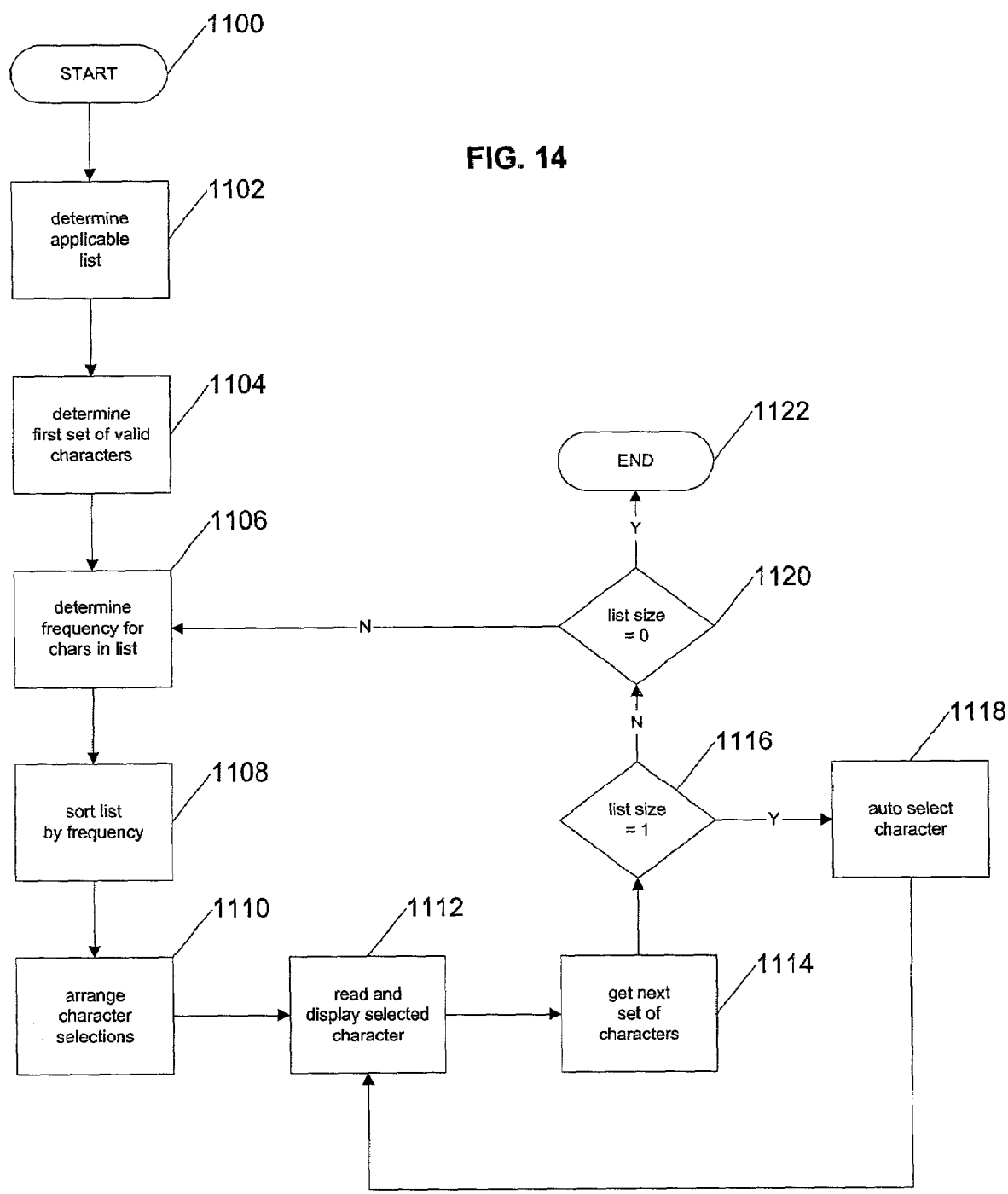
FIG. 14 is a flowchart illustrating an example process for dynamic key assignment according to an embodiment of the present invention.

FIG. 14 is a flowchart illustrating an example process for dynamic key assignment according to an embodiment of the present invention. The process begins with step 1100. Initially, the system determines an applicable predefined list to be used with the current input request, as illustrated in step 1102. For instance, using the examples described above, it is assumed that the system is expecting input from the user in the form of a city from California or Nevada. It should be noted that the system may dynamically generate the predefined list or the predefined list may be saved in a data storage area. Additionally, predefined lists may be accessible to the system through a communications mechanism. For example, an auto PC may have a wireless link to a network that stores a variety of lists. In one embodiment, predefined lists may be obtained from a data warehouse on the Internet.

Typically, a predefined list may comprise a subset of a larger predefined list. Advantageously, the predefined list can be reduced in size to be as small as possible in order to maximize the benefits of the present invention. Accordingly, the system may generate a predefined list based on user interaction, whenever possible. For example, the system may prompt the user to indicate a particular geographical region of interest. In the examples described above, the particular geographical region of interest selected by the user would comprise the states of California and Nevada. Accordingly, in step 1102, the system may dynamically generate a subset of a worldwide geographical database. Preferably, in this example, the subset comprises the names of cities within the states of California and Nevada.

As stated, the size of the predefined list is limited only by the storage capacity of the computer system or device used to implement the present invention. In one embodiment, network centric databases (e.g. web sites on the Internet) can be used to provide a virtually limitless amount of data that can be used with the present invention. However, storage capacity and performance issues aside, the size of the predefined list is unlimited. Therefore, it is conceivable that an entire language dictionary can be used as a predefined list. In this fashion, generic systems having no to anticipate user input, such as word processors and the like, can benefit from the advantages of the present invention.

Once a predefined list has been determined (and/or generated), in step 1104 the predefined list is processed to determine a set of valid first characters. This can be accomplished using standard well-known database searching techniques. The first time this step is performed, the first letters of the words within the predefined list are preferably stored in memory. An example of a table illustrating the results of this step is shown as table 102 in FIG. 2.

Next, as shown in step 1106, the frequency of each valid character is determined. The frequency may be determined by summing the number of occurrences of each character that is the first character of an item in the predefined list. In step 1108, the list of valid characters is sorted according to their relative frequencies. An example of a table illustrating the results of this step is shown as table 104 in FIG. 2.

Next, as illustrated in step 1110, the valid set of first characters is displayed as a selection list on the interface control system such that the characters having greater frequencies are selectable with fewer keystrokes than the characters having lower frequencies. An example of such a selection list is shown in FIG. 3A. Alternative arrangements for selection lists are presented in FIGS. 3B and 3C.

Next, as shown in step 1112, the system reads and displays the selected character. As described below, the character can be selected by the user, or the character can be automatically selected by the system. Advantageously, the process can automatically select a character whenever the list of valid next characters comprises only a single entry. This condition is illustrated in FIG. 8, where the letter I is the only valid character that can be selected after the input string SAN_D is entered. Accordingly, instead of presenting the user with a single selectable character in the selection list as shown in FIG. 8, the system may automatically select the character for the user and then immediately display the input control system as shown in FIG. 9. In this fashion, additional keystrokes are advantageously eliminated.

Next, as illustrated in step 1114, the process queries the predefined list for the next set of valid characters. This step is similar to step 1104 in that it determines the set of valid characters from the items in the predefined list. Once the next set of valid characters is obtained, the system determines if the set of valid characters comprises a single entry, as shown in step 1116. If only a single entry is found, the condition described above is detected and the system can automatically select the single valid character, as illustrated by step 1118. After the character is automatically selected in this fashion, control passes back to step 1112 where the selected character is read and displayed.

If the number of valid characters in the set is not equal to one, the system next determines if the number of valid characters in the set is equal to zero, as shown in step 1120. If the set of valid characters contains no entries, then the input process is complete, as indicated by step 1122. If the number of valid characters in the set is not equal to zero, control passes back to step 1106, where the process repeats as described above with respect to the next set of valid characters. The process preferably repeats for each set of valid next characters until a unique item in the predetermined list is identified.

In an alternative aspect of the invention, an improved system and method for voice input is provided. FIG. 15 is a block diagram illustrating a table 1202 containing predefined lists 1204, 1206, and 1208. In one embodiment, list 1204 may contain letters of an alphabet, list 1206 may contain a mapping, or index to the corresponding letter, and list 1208 may contain the voice command for the corresponding letter and mapping.

For example, in the first column, each letter of a defined alphabet are presented. In this example, the English alphabet. Alternatively, the defined alphabet could be a set of available characters in a data input system. Other potential sets of letters of characters may also define an alphabet. Additionally, the second column may contain a mapping or index to the letter according to, for example, a standard 3×3 matrix telephonic keypad as previously shown and described with respect to FIG. 11.

On such a 3×3 matrix keypad, the "2" key may contain the letters "A" "B" and "C." In order to uniquely identify one of these three letters, the "2" key can be pushed a certain number of times. For example, to identify the letter "A" the "2" key can be pushed just once. Similarly, to identify the letter "B" the "2" key can be pushed twice, and to identify the letter "C" the "2" key can be pushed three times. This type of conventional data input scheme typically continues through the keys of the keypad for the remaining letters of the alphabet.

Advantageously, speech recognition systems are well suited to distinguish between the voice commands representing the single digit numerals, for example: "ONE", "TWO", "THREE", "FOUR", "FIVE", "SIX", "SEVEN", "EIGHT", "NINE", and "ZERO". Therefore, the voice commands of column 1208 corresponding to the mappings in column 1206 can provide more clearly enunciable and distinguishable voice commands to identify a desired letter in a voice data input system.

In one embodiment, such a voice input system can be especially useful when the device being used is a phone-type data entry device with a predefined location for letters and numbers, such as a standard telephone keypad. For example, following the alphabet and mappings presented in table 1202, to enter the letter "C" a user may simply speak the voice command "TWO" followed by the voice command "THREE" rather than pressing on the "2" key three times as available in current phone devices.

Figure 16A:
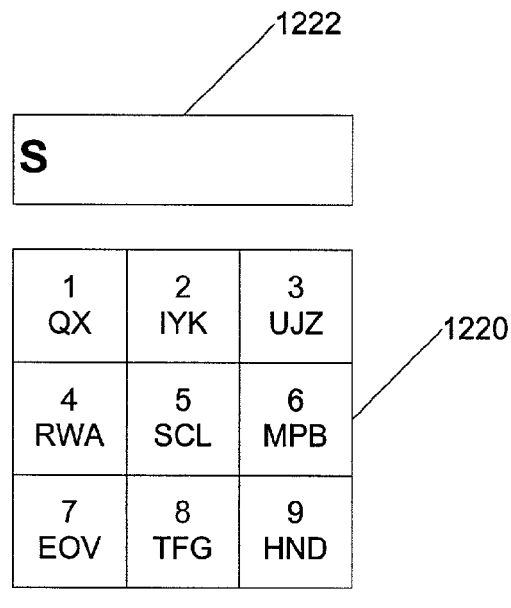
FIGS. 16A–H are block diagrams illustrating example dynamic mappings of characters on a keypad according to an embodiment of the present invention.
Figure 16B:
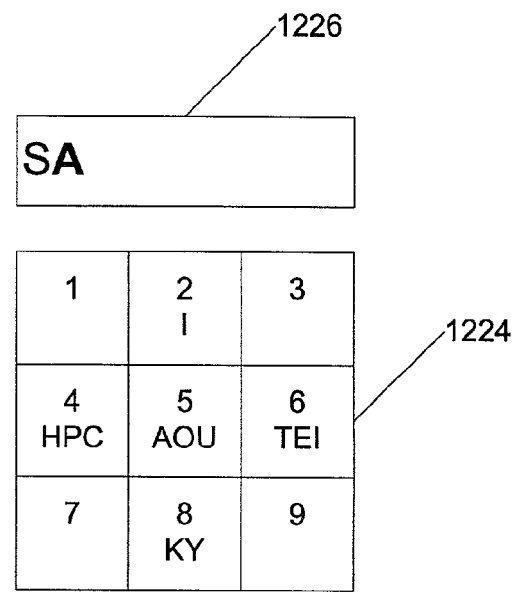

FIGS. 16A–H are block diagrams illustrating example dynamic mappings of characters on a keypad. Using the dynamic mapping techniques previously described, the letters associated with a 3×3 matrix telephonic keypad can be selected through the use of voice commands (in addition to key presses, as previously described). For example, in FIG. 16A, the letter "S" can be selected according to the dynamic keypad mapping by speaking the command: "FIVE" "ONE." Advantageously, according to the mapping principles, the most common next letter can always be placed in the same location for ease of entry. In FIG. 16B, the next letter "A" can also be selected by speaking the command: "FIVE" "ONE."

Figure 16C:
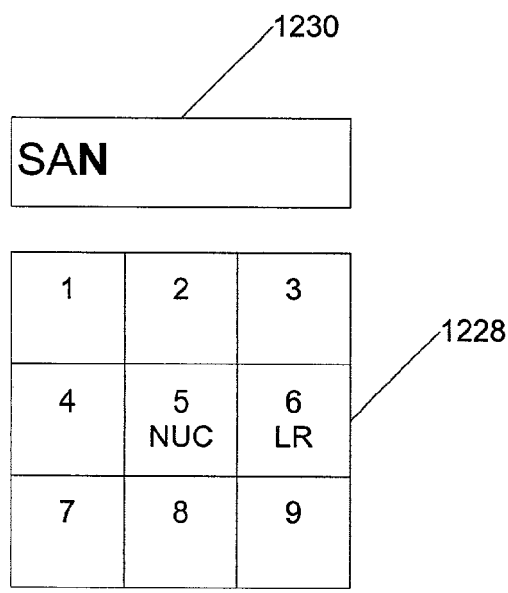
Figure 16D:
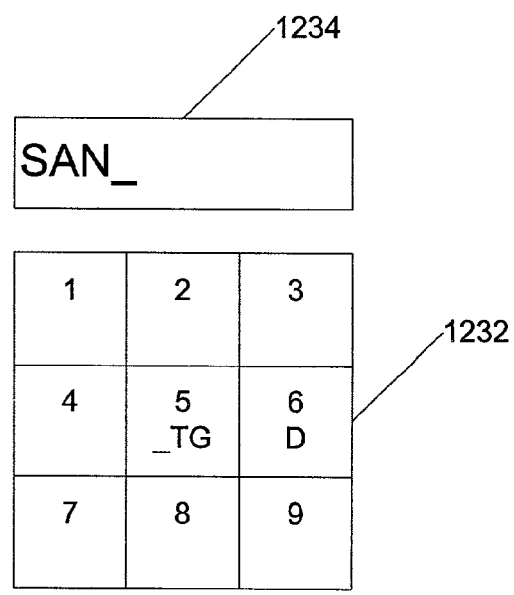
Figure 16E:
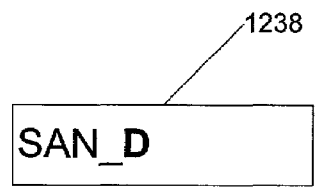
Figure 16F:

The same voice command "FIVE" "ONE" can be used to select the following two characters "N" and "_" (space), as shown in FIGS. 16C and 16D, respectively. In FIG. 16E, the next letter selected, "D" is not the most common next letter. According to the mapping presented in keypad 1236, the letter "D" can be selected by speaking the command: "FOUR" "ONE." Next, the "I" character can be selected by speaking the command "FIVE" "ONE" or the system may automatically select the "I" character because it is the only available character for input, as illustrated in keypad 1240.

Figure 16G:
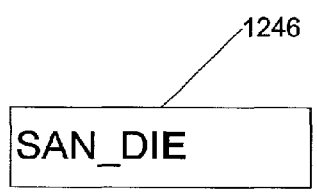
Figure 16H:

In FIG. 16G the command "FIVE" "ONE" can be used to select the next letter "E." At this point, or at any other point in the data entry process when a unique entry has been identified, the remaining letters in the entry can be filled into the display 1250, as shown in FIG. 16H. Here, the voice command "YES" or the voice command "NO" may be used to indicate if the correct completed entry is shown on the display 1250. Additionally, in various embodiments having case sensitive data entry, the voice commands "UPPER" and "LOWER" can be used to distinguish between upper and lower case characters. Alternative voice commands may also be employed to indicate case.

FIGS. 17A–H are block diagrams illustrating example predefined lists associated with contextual voice data entry for an input control system. The format of the display presented in FIG. 17A–H may be more suitable to a car PC or some other type of device with wide, but not deep presentation capabilities. In one embodiment, a subset of the available columns may be presented on the display when the user has the ability to scroll the list from side to side. In this fashion, a smaller width display can be used to present the full set of characters available for selection.

Figure 17A:
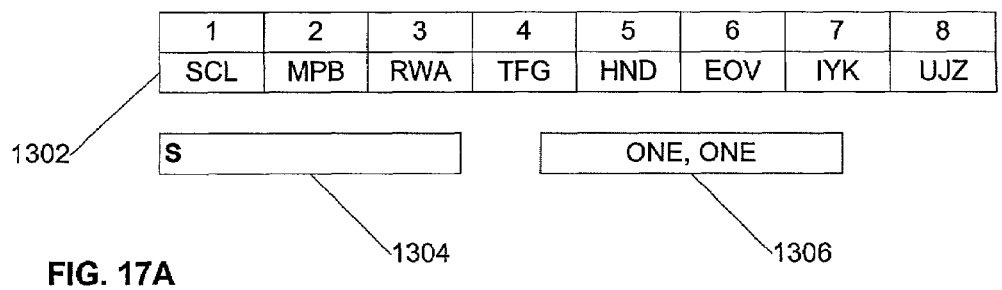
FIGS. 17A–H are block diagrams illustrating example predefined lists associated with contextual voice data entry for an input control system according to various embodiments of the present invention.

Similar to the example described above with respect to FIG. 16, the characters or letters of an alphabet can be presented on a display using a 1×9 tabular format such as format 1302 in FIG. 17A. The tabular format can also be longer or shorter depending on the length of the alphabet or character set to be displayed. Advantageously, such a format may be more suitable for visual searching. In one embodiment, selected letters can be presented in a display such as display 1304. To aid with comprehension, the voice command issued to select the letter is presented in command box 1306. In this case, the voice command "ONE" "ONE" is used to select the letter "S."

Figure 17B:
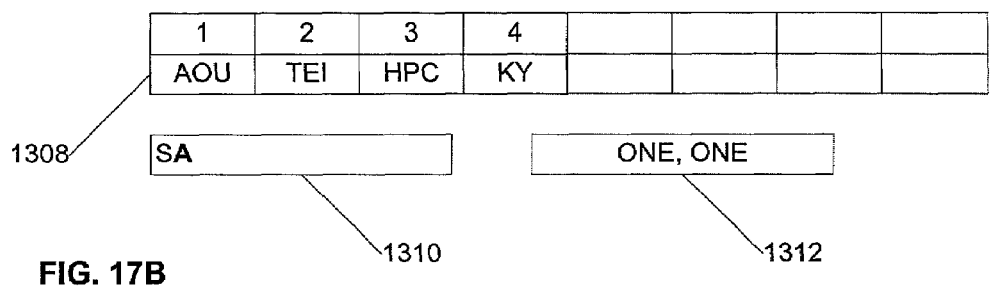
Figure 17C:
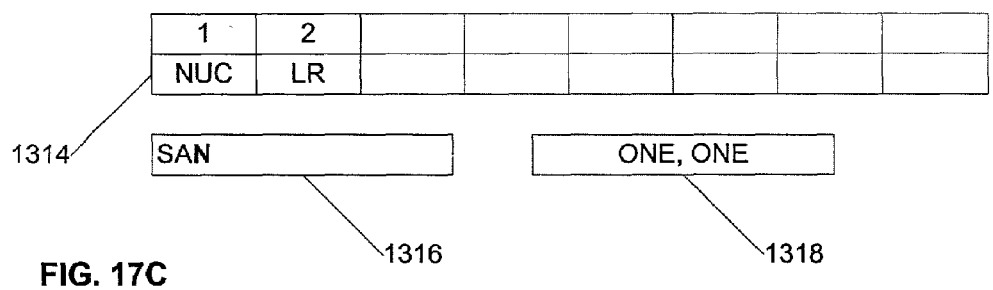
Figure 17D:
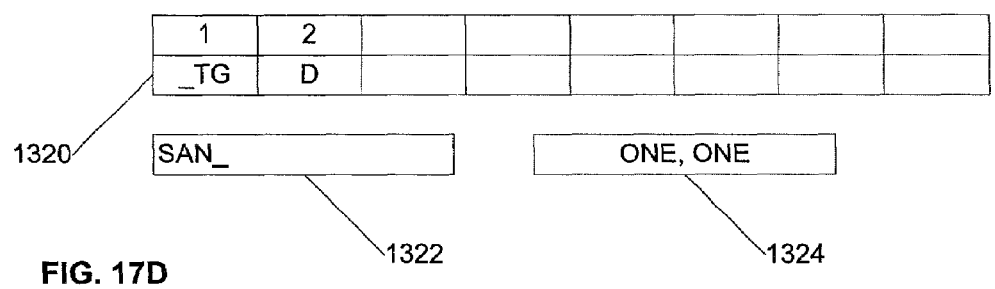
Figure 17E:
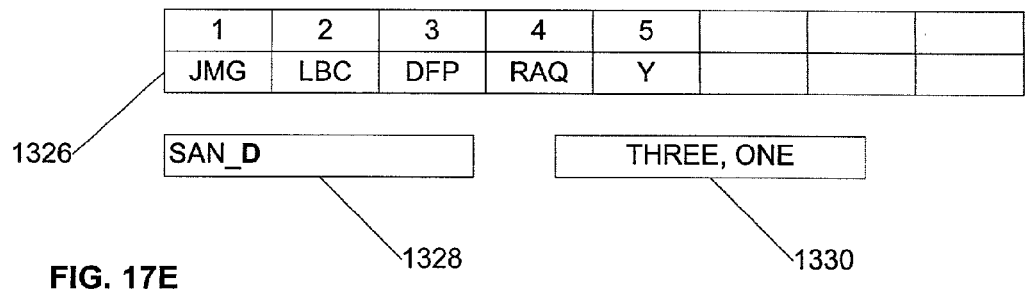
Figure 17F:
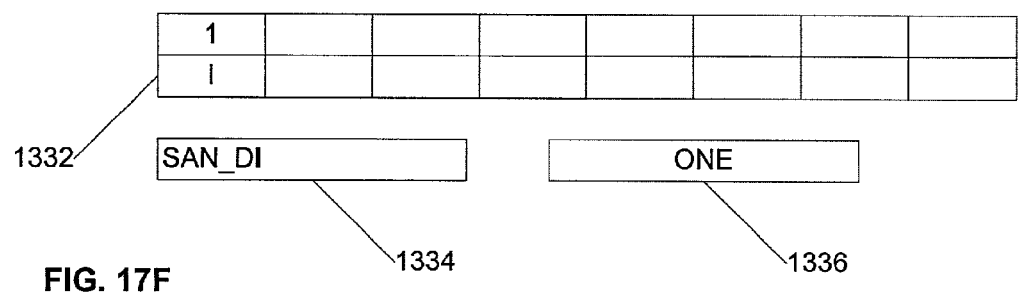
Figure 17G:
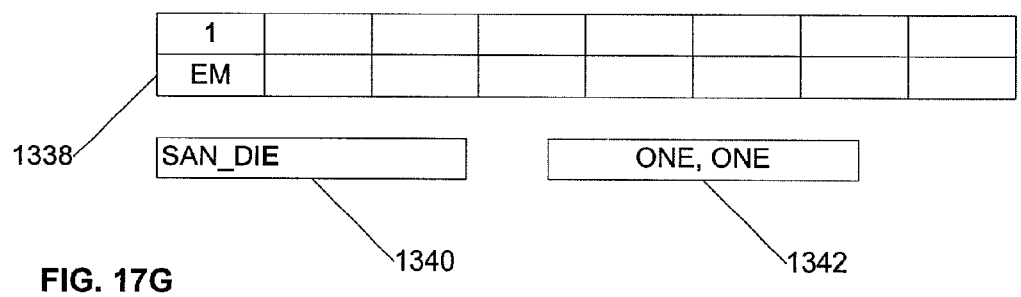

Advantageously, the linear display presented in FIGS. 17A–H can be shortened according to how many letters are available for selection as the next letter. For example, when selecting the first letter in FIG. 17A, there are 24 available letters. In FIG. 17B, only 11 letters are available, requiring only four columns. In one embodiment, this may eliminate the need to scroll the list of available letters from side to side. For example, in FIGS. 17C and 17D, the limited number of characters may be completely presented in a single screen.

Figure 17H:
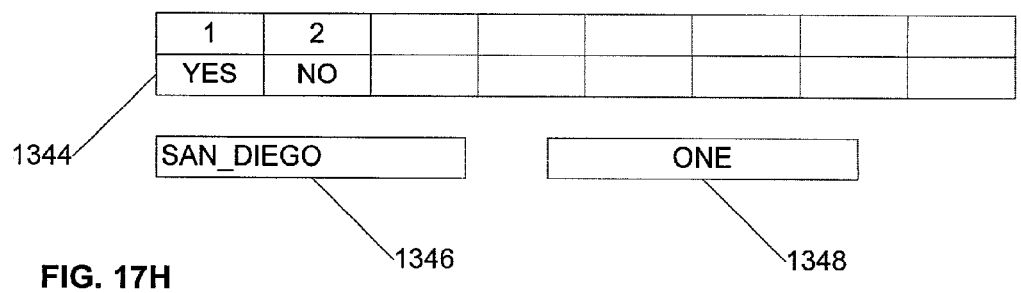

As previously described, once a particular entry in the data entry system has been uniquely identified, the system may advantageously automatically complete the entry, as shown in FIG. 17H. Once the completed entry has been presented in display 1346, the voice command "YES" or the voice command "NO" may be used to indicate if the correct completed entry is shown on the display 1346.

Figure 18A:
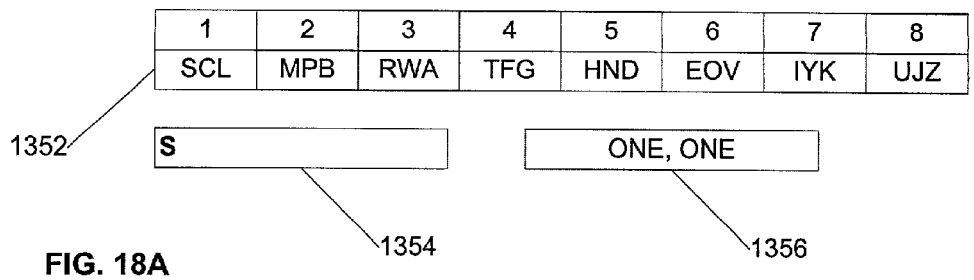
FIGS. 18A–H are block diagrams illustrating example predefined lists associated with contextual voice data entry for an input control system according to various embodiments of the present invention.
Figure 18B:
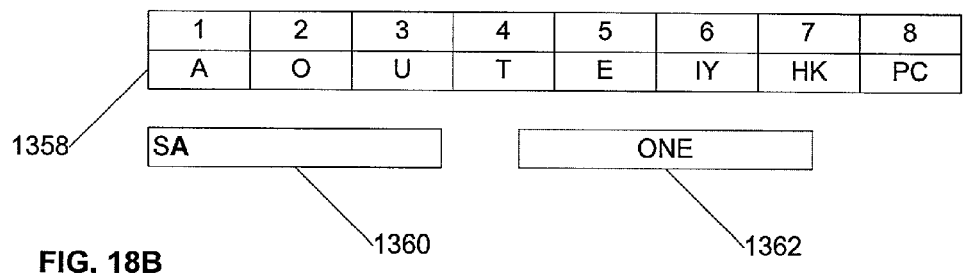
Figure 18C:
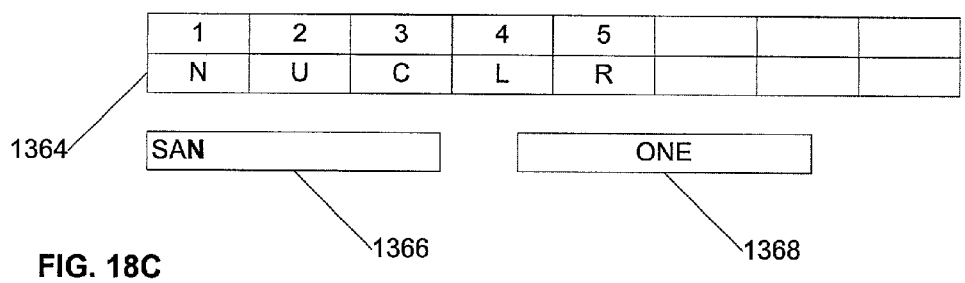
Figure 18D:
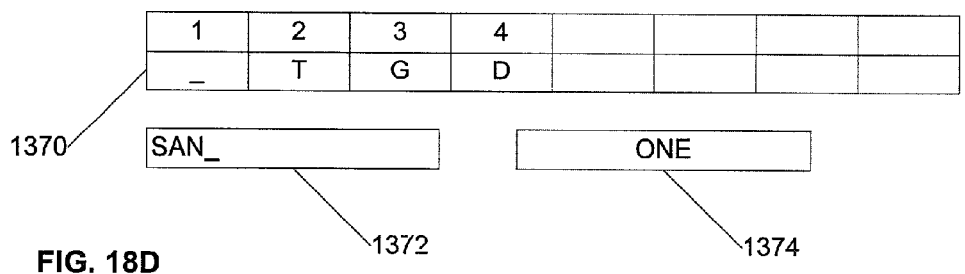
Figure 18E:
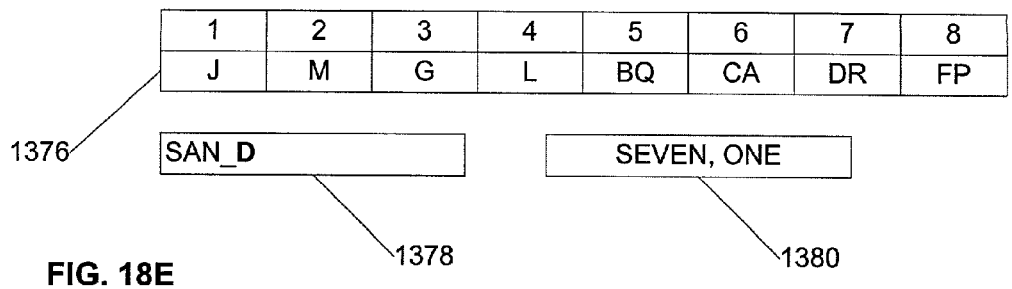
Figure 18F:
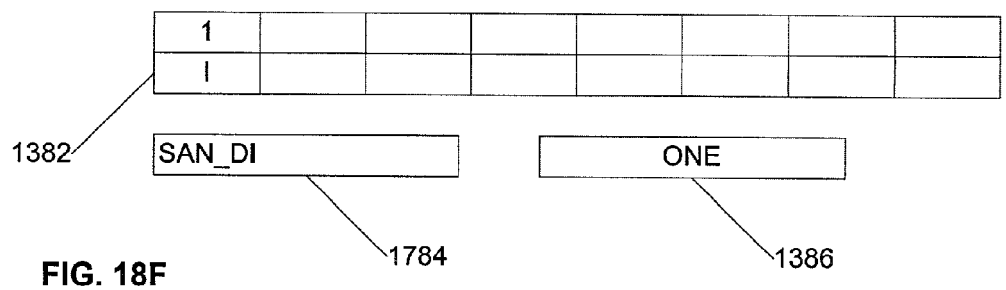
Figure 18G:
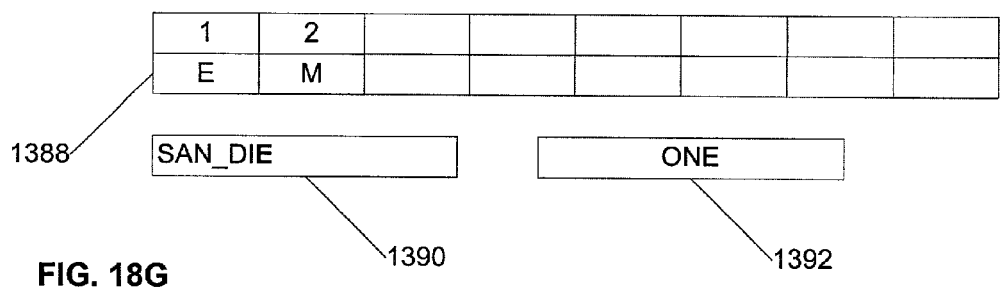
Figure 18H:
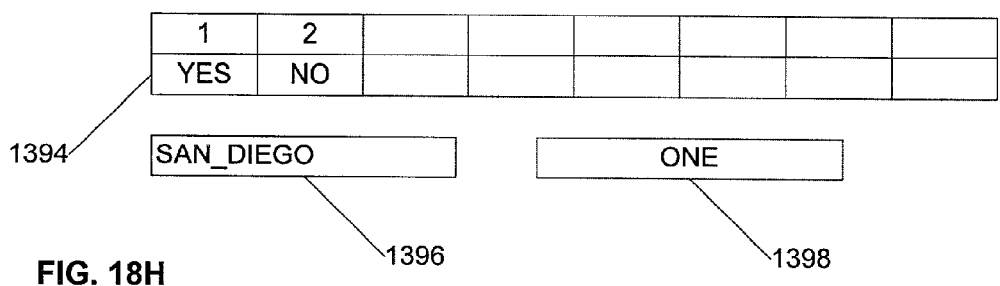

Alternative embodiments may employ different formats for the presentation of the available letters. FIGS. 18A–H are block diagrams illustrating example predefined lists associated with contextual voice data entry for an input control system according to various embodiments of the present invention. In one embodiment, a user defined priority sequence may be used to present the available characters in a preferred format. As shown in FIG. 18B, the most likely letters to be selected, according to a dynamic mapping, can be presented in a fashion that makes them easier to select. For example, by reducing the number of voice commands required.

In FIG. 18B, the available letters are distributed in format 1358 so that columns having more than one entry, and thereby requiring two voice commands, contain the least likely selections (according to the dynamic mapping). Thus, the letter "A" may advantageously be selected with the single command "ONE." In contrast, other formats for the presentation of the available letter, e.g. FIG. 17B, may require two voice commands to uniquely identify the desired selection.

Figures 19, 20:
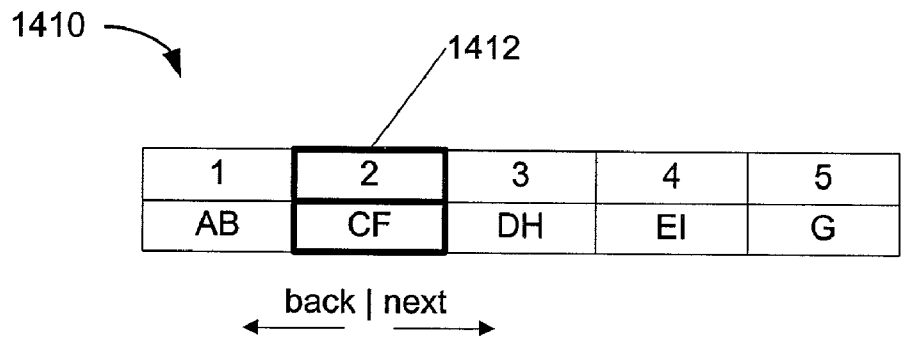
FIG. 19 is a block diagram illustrating an example user interface display according to an embodiment of the present invention.
FIG. 20 is a block diagram illustrating an example dynamically defined conditional probability matrix according to an embodiment of the present invention.

FIG. 19 is a block diagram illustrating an example user interface display 1410 according to an embodiment of the present invention. As briefly described above, when a linear format is used to display the characters/letters available for selection, a shortened display area may be scrolled left and right in order to present the entire set of available characters. In one embodiment, as presented here, a particular column 1412 may be selected, i.e. may be the active group. Voice commands may be used to scroll the selected column or active group to the left or right. For example, the voice command "BACK" can be used to scroll the active group one column to the left and the voice command "NEXT" can be used to scroll the active group one column to the right. Other voice commands may also be employed.

An additional problem in the field of voice recognition is presented by similar sounding words and letters. In the case where words are spelled using letters, conventional voice recognition systems can have trouble distinguishing between letters that sound alike, such as "B" and "D." Advantageously, using a presentation as described in FIG. 19 may solve this problem by optimizing the performance of a speech recognition system. For example, in one embodiment, the available characters in each discrete column, such as column 1412, may be dynamically assigned such that no two characters sound alike. Thus, when a particular column is selected, the voice commands used to select an available character are not similar sounding. Referring to column 1412, the voice command "C" does not sound similar to the voice command "F."

FIG. 20 is a block diagram illustrating an example dynamically defined conditional probability matrix Q according to an embodiment of the present invention. This particular matrix Q contains an alphabet consisting of the first 9 characters of the English alphabet. Other alphabets or sets of available characters can be used. For example, a set of next available characters in a data input system may define an alphabet. The matrix Q presents each character in the alphabet associated with each other character in the alphabet.

More particularly, a language may comprise an alphabet of size N having letters in the set $U=\{A_1, A_2, A_3, A_4, \ldots, A_5\}$. This language can be used as input to a speech engine. Preferably, the alphabet is not restricted to the letters in a given language. For example, an alphabet may comprise a set of letters (U) and a set of acceptable voice commands in a speech recognition system. A language may then comprise the set of acceptable combinations of items in the alphabet.

In one embodiment, the definition of the conditional probabilities of a letter in the set U of a voice recognition system is presented below.

$P(A_x/A_y)$=the probability of the letter $A_x$ being selected by the speech engine given that the letter $A_y$ was the true and actual input to the system. In this definition, x and y are integers in the set $I=\{1, 2, 3, 4, 5, \ldots, N\}$. Additionally, the probability employed may be any suitable measure reflecting the reliability of a speech recognition system and its ability to distinguish between $A_x$ and $A_y$.

For example, given the English alphabet, where U={a, b, c, d, e, f, g, h, i, j, k, l, m, n, o, p, q, r, s, t, u, v, w, x, y, z} and N=26, $P(A_2/A_6)$ is the conditional probability P(b/f). P(b/f) is the probability that the speech recognition system will resolve the sound of the letter "b" as the letter "f." The conditional probability matrix Q therefore comprises entries $Q(A_x,A_y)$ where $Q_{y,x}=P(A_x/A_y)$. With respect to FIG. 20, the conditional probability that the letter "b" will be resolved as the letter "f" is located at Q(2,6).

For example, this equation states $Q(1,1)=P(A_1/A_1)=P(a/a)$. This represents the probability that the speech recognition system will resolve the letter "a" as the letter "a". Similarly, $Q(1,2)=P(A_1/A_2)=P(a/b)$, which illustrates the probability that speech recognition system will resolve the letter "a" as the letter "b." Continuing with reference to FIG. 20, the properties of the matrix Q are as follows:

(a) If the matrix Q is set up with a probability measure, then sum of each row is 1.

(b) The diagonal entry is the dominant entry in any given row.

(c) The probability measure for Q(x,x)>Q(x,y) where x does not equal y and both x and y are in the set I.

(d) If |Q(x,x)−Q(x,y)|=a predefined threshold for a given row x, where x is not equal to y and y is in the set I, then the characters $A_x$ and $A_y$ will be separated into different clusters, where $A_x$=Q(x,x) and $A_y$=Q(x,y). For example, the letters "B" and "D" will not be grouped in one cluster.

(e) Applying the predefined threshold to the matrix Q will yield a number of subsets $S_i$, where the subset corresponds to row $_i$.

(f) The union of all subsets $S_i$ is equal to the alphabet U because each subset $S_i$ is either a repeated subset $S_i$ or mutually exclusive for a given alphabet U. For example, if $A_x$ is similar to $A_y$ and $A_y$ is similar to $A_z$, then Ax is similar to $A_z$.

(g) The number of clusters $C_n$ required by a character $A_x$ in the alphabet U is equal to the number of similar sounding characters in row $_x$ of matrix Q.

(h) The total number of clusters required to dynamically map each character in the alphabet U into unique groups is equal to the maximum $C_n$ in the matrix Q.

FIG. 21 is a block diagram illustrating an example dynamically defined conditional probability matrix according to an embodiment of the present invention. The matrix Q represents property (e) described above. In the first row of the matrix Q, the letter "A" sounds similar to the letters "A" and "H." Therefore, according to property (d), the letter "A" will not be grouped in cluster with another letter "A" or the letter "H."

FIG. 22 is a block diagram illustrating an example dynamically defined cluster table according to an embodiment of the present invention. Preferably, the cluster table contains the number of clusters required for each row in the matrix Q. In one embodiment, each row in the matrix Q may correspond to a unique letter in the alphabet U. In the cluster table of FIG. 22, the highest number of required clusters for the letters in matrix Q is 5.

FIG. 23 is a block diagram illustrating an example dynamically defined character mapping according to an embodiment of the present invention. According to the cluster table in FIG. 22, there are 5 separate clusters in FIG. 23. Each of the letters of alphabet U are included in a cluster and each cluster comprises letters that are dissimilar in sound. Advantageously, this arrangement by cluster may improve the efficiency of a speech recognition system.

Although the similar sounding letters must each be placed in a separate cluster, the remaining letters, in this case "A" "F" "H" and "I" can be distributed amongst the clusters such that they do not double up with a similar sounding letter. Various distribution techniques or strategies may be employed for placing the remaining letters. For example, if the letters are to be displayed on a standard telephonic keypad, they may be concentrated toward the center of the keypad for easy recognition. Alternatively, they may be spread out amongst the keys of the keypad to minimize the number of voice commands required to identify a letter.

In one embodiment, the letters may be displayed in a 1×9 matrix, or a smaller single row matrix. In such an embodiment, the remaining characters may be placed in a fashion that maximizes the priority of the letters. For example, each cluster may be selectable as the active group and the letters within the cluster may be arranged according to priority. Additionally, the remaining letters may be combined with the letters of the 5 clusters according to priority in order to increase the efficiency of the presentation and the necessary voice commands required to select a particular letter.

Figure 24:
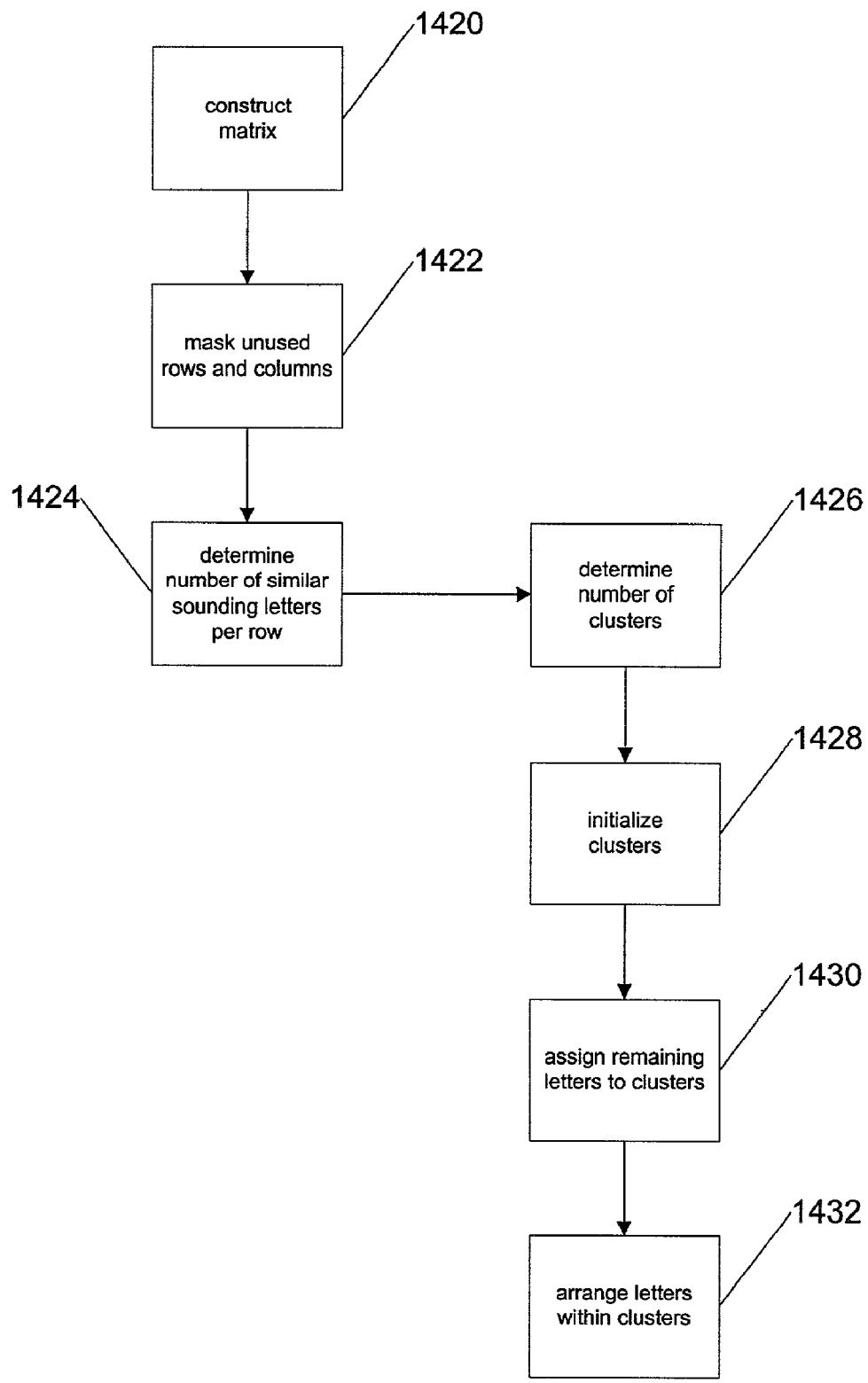
FIG. 24 is a flowchart illustrating an example process for distinguishing between similarly sounding letters in a voice recognition system according to an embodiment of the present invention.

FIG. 24 is a flowchart illustrating an example process for distinguishing between similarly sounding letters in a voice recognition system according to an embodiment of the present invention. Initially, the matrix Q is constructed, as illustrated in step 1420. The entries in the matrix Q are dependent on the characters available in the alphabet or the commands available in a speech recognition system, or both. The probability associated with each entry in the matrix is dependent upon the particular voice recognition system in use.

If the matrix Q is constructed of all of the characters in the alphabet, then the unused characters for the particular dynamic mapping can be eliminated. Accordingly, in step 1422, the rows and columns corresponding to the unused characters can be masked. Advantageously, this can reduce the size of the matrix Q and increase the operational speed of the system.

In step 1424, the number of similar sounding letters per row is determined. This determination may be made based upon the probability condition and whether the probability of success for the voice recognition system meets a predefined threshold, as previously described. Once the number of similar sounding letters has been determined for each row, the number of clusters is determined, as illustrated in step 1426. The number of clusters is preferably equal to the highest number of similar sounding letters across all of the rows in the matrix Q.

For example, if a particular row corresponds to the letter "G" it may have identified several other letters as similarly sounding, such as "B" "C" "D" "E" and "G." Based upon the associative property previously described, if the letter "G" sounds like the letter "B" and the letter "G" also sounds like the letter "C" then the letter "B" sounds like the letter "C." Thus, the identified letters in any given row are mutually exclusive and cannot be assigned to the same cluster.

Once the number of clusters has been identified, the clusters are preferably initialized, as shown in step 1428. The clusters are initialized with a letters identified in the row with the highest number of similar sounding letters. Staying with the above example, if the "G" row had the highest number of similarly sounding letters, then the 5 clusters would be initialized with the letters "B" "C" "D" "E" and "G."

Next, the remaining letters in the alphabet, as illustrated in step 1430, are assigned to the clusters. Various methods for assigning the remaining letters may be employed to maximize efficiency of the overall system. These various methods may be selected based on the type of display being used by the system, as described in alternative embodiments above. The assignment methods may also be selected based on user preferences or the overall and relative priority of the letters.

Additionally, the cluster selection preferably determines if any character already contained in the cluster is similar sounding to the character being placed. If so, then the character can be placed in a different cluster. The number of available clusters for a particular character should not be reduced to zero by virtue of similar sounding characters already being resident in the cluster. This is due to step 1426, whereby the number of clusters is selected based on the maximum number of similar sounding characters across all of the rows in the matrix Q.

Additional methods for assigning the remaining letters to the various clusters may include the application of Bay's rule to compare the maximum likelihood of separation in a cluster. Another option may be to employ a neural network that is optimized for the classification of items in a list, such as the characters in an alphabet.

Once the remaining letters have been assigned to clusters, the letters within each cluster can advantageously be arranged according to priority. This arrangement may also be dependent on the type of display being used in the particular voice recognition system.

While the particular systems and methods for dynamic key assignment in an enhanced user interface herein shown and described in detail are fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A system for accepting data input on an intelligent device having a display, the system comprising:
    a data entry means having an interface configured to accept data entry actions, the data entry means including a plurality of keys, each of the keys assigned to one or more items for entry;
    a display area having a plurality of positions, each position configured to present a previously entered item or a current item;
    a selection list generated statistically based on historical uses from a predefined database, the selection list including:
        one or more selectable items arranged in accordance with respective possibilities to immediately follow the previously entered item; and
    a movable cursor configured to highlight one of the items that is most likely to follow the previously entered item,
    wherein at least one of the keys is re-assigned to correspond to the most likely item so that the one of the keys, when activated, causes an entry of the most likely item, and
    wherein the selection list is progressively reduced with continuous entries until a completion of a word, the selection list always presents next item that is likely to follow the entries so that the one of the keys is maintained to be activated without having to move to another key to select the next item for entry.

2. The system of claim 1, wherein the selectable items are linearly arranged according to frequency of use with the most likely item at a first end and a least likely item at a second end, wherein a relative frequency of use between adjacent items is such that items closer to the first end have an equal or higher frequency of use than items closer to the second end.

3. The system of claim 1, wherein the selectable items are linearly arranged according to frequency of use with the most likely item in a center position and other items placed on opposing sides of the most likely item in order of decreasing frequency such that items closer to the center position have an equal or higher frequency of use than items further from the center position, and wherein the set of keys includes at least three keys in a line with a center key corresponding to the most likely item, and a left key and a right key corresponding respectively to two of the other items placed on the opposing sides of the most likely item.

4. The system of claim 1, wherein the selectable items are arranged according to frequency of use with the most likely item in a center position and other items placed to the left, right, top, and bottom of the most likely item in order of decreasing frequency such that items closer to the center position have an equal or higher frequency of use than items further from the center position, and wherein the set of keys includes five keys with one of the keys corresponding to the most likely item, and other four keys corresponding respectively to four of the others items placed to the left, right, top, and bottom of the most likely item.

5. The system of claim 1, wherein the selection list resides on a local storage medium.

6. The system of claim 1, wherein the selection list resides on a remote storage medium.

7. A method for data input on an intelligent device having a user interface, a display screen, and one or more keys, each of the keys assigned to one or more items for entry, the method comprising:
    identifying a predefined list including a plurality of valid input items generated statistically based on historical uses from a predefined database;
    parsing the valid input items in the predefined list to extract a set of valid characters associated with a first letter of each of the valid input items;
    determining a frequency associated with each of the valid characters;
    displaying each of the valid characters according to its frequency, such that characters with higher frequencies are selectable with fewer keystrokes than characters with lower frequencies;
    reassigning at least one of the keys to correspond to the displayed characters such that the one of the keys is maintained to be activated without having to move another key to enter a next likely one of the displayed characters based on said frequency;
    accepting a selected character when one of the keys is activated; and displaying the selected character in the data entry field.

8. The method of claim 7, wherein the displaying of the each valid character further comprises linearly arranging the valid characters according to frequency of use with the highest frequency character at a first end and the lowest frequency character at a second end, wherein the relative frequency of use between adjacent characters is such that characters closer to the first end have an equal or higher frequency of use than characters closer to the second end.

9. The method of claim 7, wherein the displaying of the each valid character further comprises linearly arranging the valid characters according to frequency of use with the highest frequency character in a center position and the remaining characters placed on opposing sides of the highest frequency character in order of decreasing frequency such that characters closer to the center position have an equal or higher frequency of use than characters further from the center position.

10. The method of claim 7, wherein the displaying of the each valid character further comprises arranging the valid characters according to frequency of use with the highest frequency character in a center position and the other characters placed to the left, right, top, and bottom of the highest frequency item in order of decreasing frequency such that characters closer to the center position have an equal or higher frequency of use than characters further from the center position.

11. The method of claim 7, wherein the predefined list resides on a local storage medium.

12. The method of claim 7, wherein the predefined list resides on a remote storage medium.

13. A method for dynamic key assignment on an intelligent device having a touch screen display, the method comprising:

a) receiving an entry from the touch screen;

b) identifying a list of characters generated statistically based on historical uses from a predefined database wherein each of the characters is likely to follow the entry;

c) determining a frequency associated with each of the characters;

d) displaying each of the characters according to its corresponding frequency, such that the characters are presented on the touch screen display in an arrangement in which a next likely is displayed at the same location as the character just entered, so that a user chooses one of the characters without moving around the touch screen to activate the one of the characters, wherein characters with higher frequencies are more selectable than characters with lower frequencies;

e) accepting a selected character; and f) repeating above steps b), c), and d) to provide another list of characters each of which is likely to follow the selected character following the previous entry.

14. The method of claim 13, wherein the arrangement to display the list of characters is to place a limited number of the characters immediately around the entry, and the remaining of the characters further form the entry.

15. The method of claim 13, further comprising displaying whole words, whole phrases or sentences when the determining of the frequency shows there is a very limited number of characters each of which is likely to follow what has been entered from the touch screen.

* * * * *